United States Patent
Hamano et al.

(10) Patent No.: US 10,523,860 B2
(45) Date of Patent: Dec. 31, 2019

(54) FOCUS DETECTION DEVICE, CONTROL METHOD THEREOF, AND IMAGE CAPTURE APPARATUS

(71) Applicant: CANON KABUSHIKI KAISHA, Tokyo (JP)

(72) Inventors: Hideyuki Hamano, Kawasaki (JP); Hirokazu Ishii, Chofu (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/589,357

(22) Filed: May 8, 2017

(65) Prior Publication Data

US 2017/0332003 A1 Nov. 16, 2017

(30) Foreign Application Priority Data

May 12, 2016 (JP) .................................. 2016-096257
May 27, 2016 (JP) .................................. 2016-106714

(51) Int. Cl.
*H04N 5/232* (2006.01)
*H04N 9/04* (2006.01)
(Continued)

(52) U.S. Cl.
CPC ........... *H04N 5/23212* (2013.01); *G02B 7/34* (2013.01); *G02B 7/36* (2013.01); *H04N 1/00* (2013.01);
(Continued)

(58) Field of Classification Search
CPC .. H04N 5/23212; H04N 5/363; H04N 5/3696; H04N 9/045; H04N 5/37457; H04N 5/357; H04N 1/00; G02B 7/36; G02B 7/34

See application file for complete search history.

(56) References Cited

U.S. PATENT DOCUMENTS

| 2013/0107067 A1* | 5/2013 | Miyakoshi | ......... H04N 5/23212 348/208.5 |
| 2013/0201383 A1* | 8/2013 | Okado | ..................... G02B 7/34 348/345 |
| 2016/0344922 A1* | 11/2016 | Aoki | ..................... H04N 5/3696 |

FOREIGN PATENT DOCUMENTS

| CN | 102652432 A | 8/2012 |
| CN | 103167236 A | 6/2013 |

(Continued)

OTHER PUBLICATIONS

The above foreign patent documents were cited in a Sep. 30, 2019 Chinese Office Action, which is enclosed with an English Translation, that issued in Chinese Patent Application No. 201710335199.7.

*Primary Examiner* — Albert H Cutler

(74) *Attorney, Agent, or Firm* — Cowan, Liebowitz & Latman, P.C.

(57) ABSTRACT

A plurality of pairs of image signals each constituted by a first signal obtained by performing photoelectric conversion on light flux that passes through a first pupil area in the exit pupil of an imaging optical system and a second signal obtained by performing photoelectric conversion on light flux that passes through a second pupil area are generated. The plurality of pairs of signals differ in the correlation amount of noise components of the first and second signals constituting the pairs of signals. One of defocus amounts obtained from the pairs of signals is used to adjust the focus distance of the imaging optical system. Accordingly, a focus detection device that can suppress the influence of correlated noise included in the pairs of image signals on focus detection and a control method thereof are obtained.

18 Claims, 10 Drawing Sheets

(51) Int. Cl.
  *H04N 5/3745* (2011.01)
  *H04N 5/357* (2011.01)
  *G02B 7/36* (2006.01)
  *G02B 7/34* (2006.01)
  *H04N 5/363* (2011.01)
  *H04N 1/00* (2006.01)

(52) U.S. Cl.
  CPC ............ *H04N 5/357* (2013.01); *H04N 5/363* (2013.01); *H04N 5/37457* (2013.01); *H04N 9/045* (2013.01)

(56) References Cited

FOREIGN PATENT DOCUMENTS

| | | |
|---|---|---|
| CN | 104065871 A | 9/2014 |
| CN | 104581137 A | 4/2015 |
| CN | 104618639 A | 5/2015 |
| CN | 105516582 A | 4/2016 |
| JP | 2008-052009 A | 3/2008 |
| JP | 2014-182360 A | 9/2014 |
| JP | 2016-066015 A | 4/2016 |

* cited by examiner

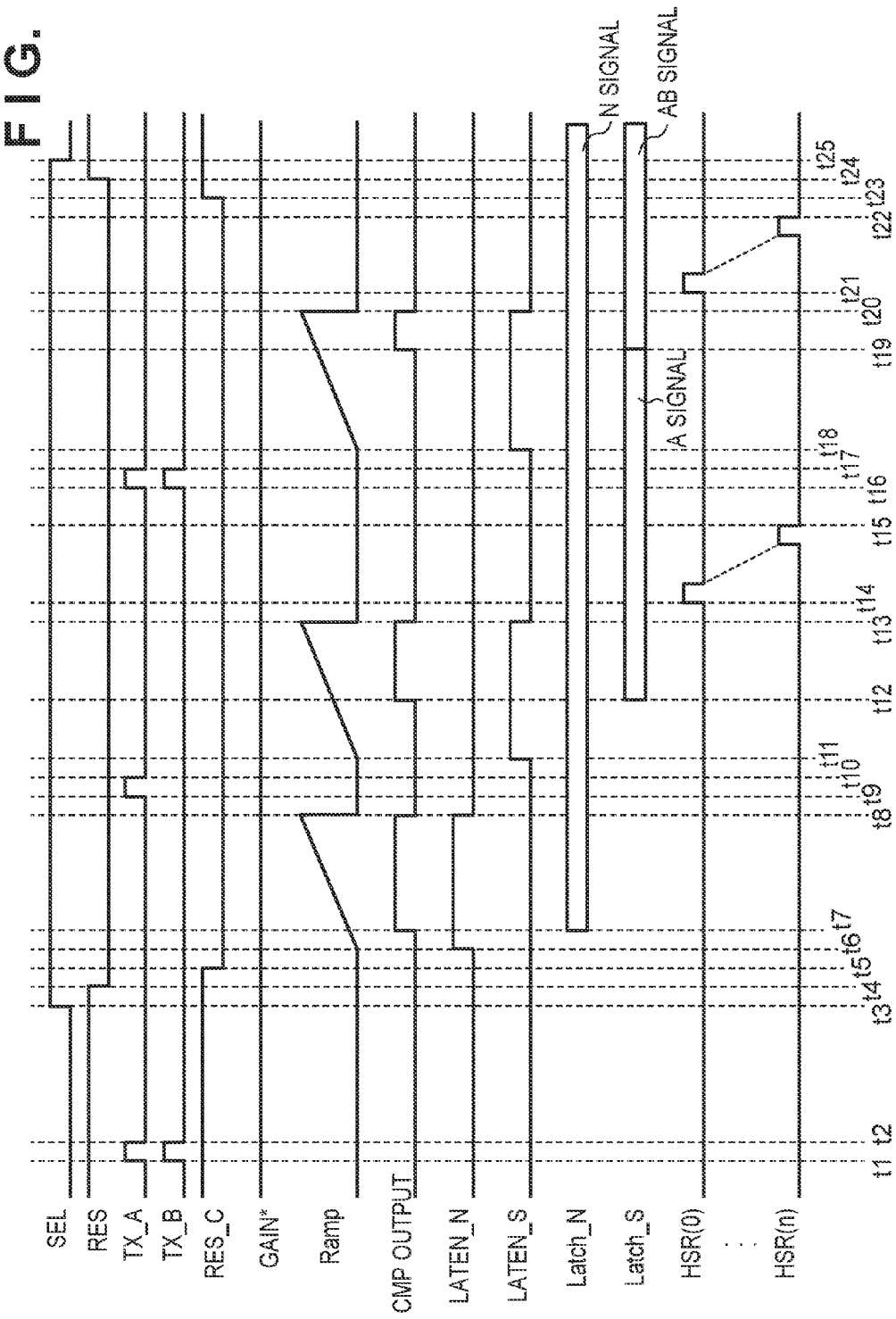

FOCUS DETECTION DEVICE, CONTROL METHOD THEREOF, AND IMAGE CAPTURE APPARATUS

BACKGROUND OF THE INVENTION

Field of the Invention

The present invention relates to a focus detection device, a control method thereof, and an image capture apparatus.

Description of the Related Art

A device that performs pupil-division focus detection using an image sensor in which a microlens is formed in each of the pixels arranged two-dimensionally is disclosed in Japanese Patent Laid-Open No. 2014-182360. This apparatus has a configuration in which one microlens is shared by two photoelectric conversion portions. Accordingly, in a first photoelectric conversion portion among the two photoelectric conversion portions that share the microlens, a signal that is based on light flux that exits a first area in the exit pupil of the imaging optical system is obtained. Also, in the second photoelectric conversion portion, a signal that is based on light flux that exits a second area in the exit pupil of the imaging optical system is obtained. Correlation between a sequence of signals obtained from a plurality of first photoelectric conversion portions and a sequence of signals obtained from a plurality of second photoelectric conversion portions is computed, the phase difference of the sequences of signals is computed, and thereby a defocus amount can be computed from the phase difference.

In addition, it is possible to obtain output similar to that of a general pixel that has one photoelectric conversion portion per microlens, by adding the outputs of the first photoelectric conversion portion and the second photoelectric conversion portion that share the microlens. Therefore, it is possible to obtain three types of output, namely, the output of the first photoelectric conversion portion (A signal), the output of the second photoelectric conversion portion (B signal) and addition output of the first and second photoelectric conversion portions (A+B signal) from one pixel. In Japanese Patent Laid-Open No. 2014-182360, the output of one of the photoelectric conversion portions (for example, the A signal) is read out, the A+B signal is then read out, and the B signal is generated by subtracting the A signal from the A+B signal without being read out separately. Accordingly, three types of signals can be obtained by performing readout twice.

For example, even if the A signal and the B signal are read out, and the A+B signal is generated by adding the A signal and the B signal without being read out, it is possible to obtain three types of signals by performing readout twice. However, the A signal and the B signal include random noise due to the readout circuit. Therefore, the A+B signal obtained by adding the A signal and the B signal includes the random noise of the A and B signals. An increase in random noise deteriorates the image quality, and thus in Japanese Patent Laid-Open No. 2014-182360, the A+B signal is obtained by being read out, and the B signal (or the A signal) is generated by subtracting the A signal (or the B signal) signal from the A+B signal.

In the case of performing focus detection, a sequence of A signals for correlation computation is generated from A signals, and a sequence of B signals for correlation computation is generated from B signals generated by subtracting the A signals from A+B signals, and thereby pairs of image signals for focus detection are generated. After that, a correlation amount is computed while changing the relative shift amount between the sequence of A signals and the sequence of B signals, and a shift amount at which the correlation amount is minimized (correlation is maximized) is searched for. However, the B signal generated by subtracting the A signal from the A+B signal includes a noise component that is correlated to the noise component included in the A signal, and thus when the shift amount between the sequence of A signals and the sequence of B signals is 0, the magnitude of the noise component has a specific value compared with a non-zero shift amount. In addition, in a state where the S/N ratio is low, such as, for example, in a case where the contrast and the luminance of an object is low, the focus detection accuracy may deteriorate due to the noise component when the shift amount is 0.

Moreover, the correlation of the noise components of the sequences of signals constituting the pairs of image signals is not limited to the case where the B signals are generated by subtracting the A signals from the A+B signals. Also in a case where the noise source on the signal path is shared, such as, for example, in a case where a signal read out from the first photoelectric conversion portion and a signal read out from the second photoelectric conversion portion are amplified by the same amplifier, the noise components of the sequences of signals constituting the pairs of image signals are correlated.

SUMMARY OF THE INVENTION

The present invention has been made in view of such issues with conventional techniques. In a focus detection device that performs focus detection by phase difference detection based on pairs of image signals obtained from an image sensor and a control method thereof, the present invention suppresses the influence of correlated noise included in the pairs of image signals on focus detection.

According to an aspect of the present invention, there is provided a focus detection device comprising: a generation unit configured to generate a plurality of pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system; an obtaining unit configured to obtain, for each of the pairs of image signals, a defocus amount that is based on a correlation amount of one pair of image signals constituting the pairs of image signals; and an adjustment unit configured to adjust a focus distance of the imaging optical system based on the defocus amount, wherein: each of the pairs of image signals is constituted by a first image signal and a second image signal; the generation unit generates the first image signals from the first signals, and generates the second image signals from the second signals; correlation of noise components included in the first image signal and the second image signal constituting a second pair of image signals among the pairs of image signals is lower than correlation of noise components included in the first image signal and the second image signal constituting a first pair of image signals; and the adjustment unit adjusts the focus distance of the imaging optical system based on one of a defocus amount that is based on a correlation amount of the first pair of image signals and a defocus amount that is based on a correlation amount of the second pair of image signals.

According to another aspect of the present invention, there is provided a focus detection device comprising: a generation unit configured to generate pair of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system, of an image sensor in which are arranged pixels each having the first photoelectric conversion portion and the second photoelectric conversion portion; a computation unit configured to compute a phase difference of the pair of image signals by performing a correlation computation on the first signals and the second signals obtained from different pixels; and an adjustment unit configured to adjust a focus distance of the imaging optical system based on the phase difference, wherein the pairs of image signals include first image signals constituted by a plurality of the first signals and second image signals constituted by a plurality of the second signals.

According to a further aspect of the present invention, there is provided an image capture apparatus comprising: an image sensor that has a plurality of first photoelectric conversion portions and a plurality of second photoelectric conversion portions; and a focus detection device comprising: a generation unit configured to generate a plurality of pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system; an obtaining unit configured to obtain, for each of the pairs of image signals, a defocus amount that is based on a correlation amount of one pair of image signals constituting the pairs of image signals; and an adjustment unit configured to adjust a focus distance of the imaging optical system based on the defocus amount, wherein: each of the pairs of image signals is constituted by a first image signal and a second image signal; the generation unit generates the first image signals from the first signals, and generates the second image signals from the second signals; correlation of noise components included in the first image signal and the second image signal constituting a second pair of image signals among the pairs of image signals is lower than correlation of noise components included in the first image signal and the second image signal constituting a first pair of image signals; and the adjustment unit adjusts the focus distance of the imaging optical system based on one of a defocus amount that is based on a correlation amount of the first pair of image signals and a defocus amount that is based on a correlation amount of the second pair of image signals.

According to another aspect of the present invention, there is provided an image capture apparatus comprising: an image sensor that has a plurality of first photoelectric conversion portions and a plurality of second photoelectric conversion portions; and a focus detection device comprising: a generation unit configured to generate pair of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system, of an image sensor in which are arranged pixels each having the first photoelectric conversion portion and the second photoelectric conversion portion; a computation unit configured to compute a phase difference of the pair of image signals by performing a correlation computation on the first signals and the second signals obtained from different pixels; and an adjustment unit configured to adjust a focus distance of the imaging optical system based on the phase difference, wherein the pairs of image signals include first image signals constituted by a plurality of the first signals and second image signals constituted by a plurality of the second signals.

According to a further aspect of the present invention, there is provided a control method of a focus detection device, comprising: generating a plurality of pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system; obtaining, for each of the pairs of image signals, a defocus amount that is based on a correlation amount of one pair of image signals constituting the pairs of image signals; and adjusting a focus distance of the imaging optical system based on the defocus amount, wherein: each of the pairs of image signals is constituted by a first image signal and a second image signal; in the generating, the first image signals are generated from the first signals, and the second image signals are generated from the second signals; correlation of noise components included in the first image signal and the second image signal constituting a second pair of image signals among the pairs of image signals is lower than correlation of noise components included in the first image signal and the second image signal constituting a first pair of image signals; and in the adjusting, the focus distance of the imaging optical system is adjusted based on one of a defocus amount that is based on a correlation amount of the first pair of image signals and a defocus amount that is based on a correlation amount of the second pair of image signals.

According to another aspect of the present invention, there is provided a control method of a focus detection device, comprising: generating pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system, of an image sensor in which are arranged pixels each having the first photoelectric conversion portion and the second photoelectric conversion portion; computing, using the pairs of image signals, a phase difference of one pair of image signals by performing a correlation computation in which the first signals and the second signals obtained from different pixels are paired; and adjusting a focus distance of the imaging optical system based on the phase difference, wherein the pairs of image signals include first image signals constituted by a plurality of the first signals and second image signals constituted by a plurality of the second signals.

According to a further aspect of the present invention, there is provided a non-transitory computer-readable medium that stores a program for causing a computer of a focus detection device to function as a focus detection device comprising: a generation unit configured to generate a plurality of pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system; an obtaining unit configured to obtain, for each of the pairs of image signals, a defocus amount that is based on a correlation amount of one pair of image signals constituting the pairs of image signals; and an adjustment unit configured to adjust a focus distance of the imaging optical system based on the defocus amount, wherein: each of the pairs of image signals is constituted by a first image signal and a second image signal; the generation unit generates the first image signals from the first signals, and generates the second image signals from the second signals; correlation of noise components included in the first image signal and the second image signal constituting a second pair of image signals among the pairs of image signals is lower than correlation of noise components included in the first image signal and the second image signal constituting a first pair of image signals: and the adjustment unit adjusts the focus distance of the imaging optical system based on one of a defocus amount that is based on a correlation amount of the first pair of image signals and a defocus amount that is based on a correlation amount of the second pair of image signals.

According to another aspect of the present invention, there is provided a non-transitory computer-readable medium that stores a program for causing a computer of a focus detection device to function as a focus detection device comprising: a generation unit configured to generate pair of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system, of an image sensor in which are arranged pixels each having the first photoelectric conversion portion and the second photoelectric conversion portion; a computation unit configured to compute a phase difference of the pair of image signals by performing a correlation computation on the first signals and the second signals obtained from different pixels; and an adjustment unit configured to adjust a focus distance of the imaging optical system based on the phase difference, wherein the pairs of image signals include first image signals constituted by a plurality of the first signals and second image signals constituted by a plurality of the second signals.

Further features of the present invention will become apparent from the following description of exemplary embodiments with reference to the attached drawings.

BRIEF DESCRIPTION OF THE DRAWINGS

FIG. 4 is a timing chart showing an exemplary operation of the image sensor in FIG. 3.

DESCRIPTION OF THE EMBODIMENTS

First Embodiment

Exemplary embodiments of the present invention will now be described in detail in accordance with the accompanying drawings. Here, an embodiment will be described in which a focus detection device according to the present invention is applied to an interchangeable-lens digital single-lens reflex camera (a camera system). However, the focus detection device according to the present invention can be applied to any electronic device provided with an image sensor that can generate signals used for focus detection by phase difference detection. Examples of such electronic devices include general cameras such as digital still cameras and digital video cameras, as well as mobile phones, computer devices, media players, robot devices, game machines, home electric appliances and the like that have a camera function, but are not limited thereto.

Figure 1:
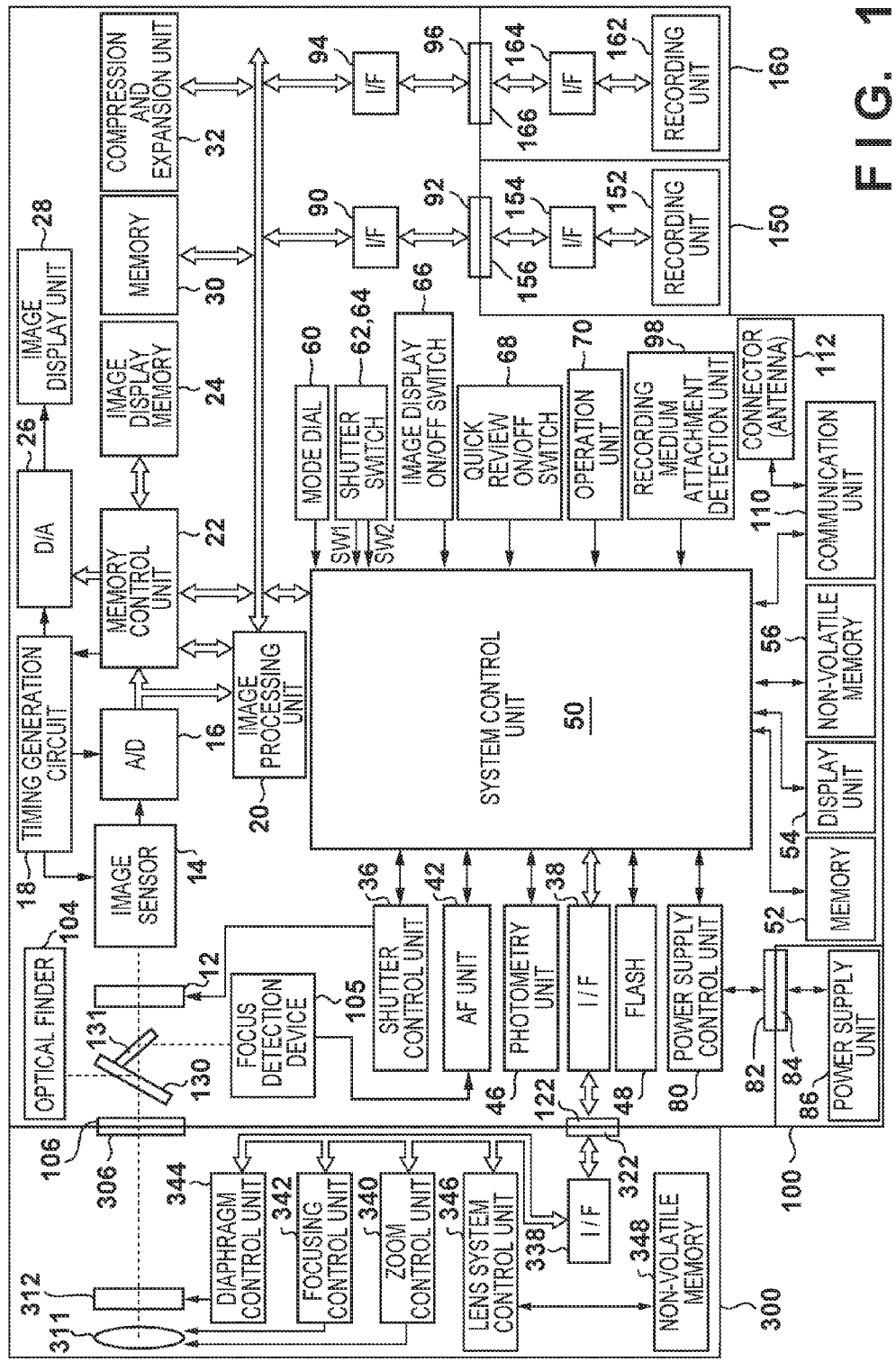
FIG. 1 is a block diagram showing an exemplary functional configuration of a camera system as an example of an image capture apparatus provided with a focus detection device according to embodiments of the present invention.

FIG. 1 is a diagram showing, as an example of an image capture apparatus provided with a focus detection device according to the embodiments of the present invention, an exemplary configuration of a camera system constituted by a camera capable of interchanging photographing lenses and a taking lens. In FIG. 1, the camera system is constituted by a camera 100 and an interchangeable photographing lens 300.

Light flux that has passed through the photographing lens 300 passes through a lens mount 106, is reflected upward by a main mirror 130, and enters an optical finder 104. The optical finder 104 enables the photographer to shoot an object optical image while observing the object optical image. Some functions of a display unit 54 such as in-focus indication, hand shake warning display, aperture value display, exposure correction display and the like are installed in the optical finder 104.

A portion of the main mirror 130 is formed by a semi-transmissive half mirror, and a portion of light flux that enters the main mirror 130 passes through this half mirror portion, and is reflected downward by a sub mirror 131, and enters a focus detection device 105. The focus detection device 105 is a focus detection device that adopts a phase difference detection method, and that has a secondary imaging optical system and a line sensor, and outputs a pair of image signals to an AF unit (autofocus unit) 42. The AF unit 42 performs phase difference detection computation on the pair of image signals, and obtains the defocus amount and direction of the photographing lens 300. Based on this computation result, a system control unit 50 performs focus lens drive control on a focus control unit 342 (described later) of the photographing lens 300.

In the case of performing still image shooting, electronic finder display, or moving image shooting when focus adjustment processing of the photographing lens 300 has ended, the main mirror 130 and the sub mirror 131 are moved out of the light path using a quick return mechanism (not illustrated). Light flux that passes through the photographing lens 300 and enters the camera 100 can then enter an image sensor 14 via a shutter 12 for controlling the exposure amount. After a shooting operation by the image sensor 14 ends, the main mirror 130 and the sub mirror 131 return to the positions as illustrated.

The image sensor 14 is a CCD or CMOS image sensor, and has a configuration in which a plurality of pixels that have a photoelectric conversion area (or a photodiode) are arranged two-dimensionally. The image sensor 14 outputs electrical signals corresponding to an object optical image. The electrical signals that have undergone photoelectric conversion in the image sensor 14 are sent to an A/D converter 16, and the analog signal output is converted into digital signals (image data). Note that, as will be described later, the A/D converter 16 may be incorporated in the image sensor 14.

The image sensor 14 according to this embodiment is configured such that at least some of the pixels have a plurality of photoelectric conversion areas (or photodiodes). As described above, a pixel having such a configuration can output signals used for focus detection by phase difference detection. Therefore, even if the main mirror 130 and the sub mirror 131 are moved out of the light path using the quick return mechanism, and light does not enter the focus detection device 105, it is possible to perform focus detection by phase difference detection using the output of the image sensor 14.

A timing generation circuit 18 supplies a clock signal and a control signal to the image sensor 14, the A/D converter 16, and a D/A converter 26. The timing generation circuit 18 is controlled by a memory control unit 22 and the system control unit 50. The system control unit 50 controls the timing generation circuit 18 so as to supply, to the image sensor 14, a control signal for reading out, from a pixel having a plurality of photoelectric conversion areas, the output of a portion of the photoelectric conversion areas, or adding and reading out the output of all the photoelectric conversion areas.

An image processing unit 20 applies predetermined processing such as pixel interpolation processing, white balance adjustment processing and color conversion processing to image data from the A/D converter 16 or image data from the memory control unit 22.

The image processing unit 20 also generates a pair of sequences of signals used for focus detection by phase difference detection, from output signals used for generating focus detection signals, out of the image data from the A/D converter 16 (output signals of the image sensor 14). After that, the pair of sequences of signals are sent to the AF unit 42 via the system control unit 50. The AF unit 42 detects the phase difference (the shift amount) between the sequences of signals by computing the correlation between the pair of sequences of signals, and converts the phase difference into a defocus amount and a defocus direction of the photographing lens 300. The AF unit 42 outputs the converted defocus amount and direction to the system control unit 50. The system control unit 50 drives the focus lens through the focus control unit 342 of the photographing lens 300 so as to adjust the focus distance of the photographing lens 300.

The image processing unit 20 can also compute a contrast evaluation value based on signals (equivalent to the above-described A+B signals) for generating normal image data obtained from the image sensor 14. The system control unit 50 performs shooting using the image sensor 14 while changing the focus lens position through the focus control unit 342 of the photographing lens 300, and checks the change in contrast evaluation value computed by the image processing unit 20. The system control unit 50 then drives the focus lens to a position at which the contrast evaluation value is maximized. In this manner, the camera 100 of this embodiment can also perform focus detection by contrast detection.

Therefore, even if the main mirror 130 and the sub mirror 131 have been moved out of the light path, the camera 100 can perform both focus detection by phase difference detection and focus detection by contrast detection based on signals obtained from the image sensor 14, as in live-view display and moving image shooting. The camera 100 can also perform focus detection by phase difference detection using the focus detection device 105, in normal still image shooting in which the main mirror 130 and the sub mirror 131 are on the light path. In this manner, the camera 100 can perform focus detection in any state of still image shooting, live-view display, and moving image shooting.

The memory control unit 22 controls the A/D converter 16, the timing generation circuit 18, the image processing unit 20, an image display memory 24, the D/A converter 26, a memory 30, a compression and decompression unit 32. Data of the A/D converter 16 is written in the image display memory 24 or the memory 30 via the image processing unit 20 and the memory control unit 22, or via the memory control unit 22 only. Image data for display written in the image display memory 24 is displayed, via the D/A converter 26, on an image display unit 28 constituted by a liquid crystal monitor or the like. An electronic finder function (live-view display) can be realized by sequentially displaying a moving image shot with the image sensor 14 on the image display unit 28. The image display unit 28 can turn on/off display according to an instruction of the system control unit 50, and when display is off, the power consumption of the camera 100 can be greatly reduced.

Moreover, the memory 30 is used for temporarily storing still images and moving images that have been shot, and has a sufficient storage capacity for storing a predetermined number of still images and a moving image of a predetermined time. Accordingly, even in the case of continuous shooting and panoramic shooting, a large volume of one or more images can be written in the memory 30 at a high speed. Also, the memory 30 can also be used as a work area of the system control unit 50. The compression and decompression unit 32 has a function for compressing and decompressing image data by adaptive discrete cosine transform (ADCT) or the like, and reads out images stored in the memory 30, performs compression processing or decompression processing, and writes the image data after being processed back in the memory 30.

A shutter control unit 36 controls the shutter 12 based on photometric information from a photometry unit 46 in cooperation with a diaphragm control unit 344 for controlling a diaphragm 312 of the photographing lens 300. An interface unit 38 and a connector 122 electrically connect the camera 100 and the photographing lens 300 to each other. These elements have a function for allowing the camera 100 and the photographing lens 300 to transmit control signals, state signals, data signals and the like to each other, as well as a function for supplying electric currents of various voltages. Moreover, a configuration may be adopted in which not only electrical communication but also optical communication, voice communication and the like are enabled.

The photometry unit 46 performs automatic exposure control (AE) processing. The luminance of an object optical image can be measured by allowing light flux that has passed through the photographing lens 300 to enter the photometry unit 46 via the lens mount 106, the main mirror 130 and a photometric lens (not illustrated). The photometry unit 46 can determine an exposure condition using a program line diagram or the like in which object luminance and exposure conditions are associated with each other. The photometry unit 46 also has a light adjustment processing function by cooperating with a flash 48. Note that the system control unit 50 can perform AE control on the shutter control unit 36 and the diaphragm control unit 344 of the photographing lens 300 based on a computation result of the image processing unit 20 computing image data of the image sensor 14. The flash 48 has a function for emitting AF auxiliary light as well as a function for adjusting flash light.

The system control unit 50 has a programmable processor such as a CPU or an MPU, and controls overall operations of the camera system by executing a program stored in advance. The system control unit 50 may load the program in a memory 52 and then execute the program0. For example, the display unit 54 is a liquid crystal display device that displays an operation state, messages and the like using characters, images, sound and the like according to execution of a program by the system control unit 50. One or more display units 54 are installed at a position in the vicinity of the operation unit of the camera 100 at which the one or more display units 54 are easy to see, for example, and are each constituted by combination of an LCD, an LED and the like. Display contents displayed on the LCD or the like among display contents of the display unit 54 include information regarding the number of shots such as the number of recorded images and the remaining number of shots that can be taken, and information regarding shooting conditions such as a shutter speed, an aperture value, exposure correction and flash. In addition, a battery remaining capacity, date and time and the like are also displayed. Moreover, some functions of the display unit 54 are installed in the optical finder 104 as described above.

A non-volatile memory 56 is an electrically erasable and recordable memory, and, for example, an EEPROM or the like is used. The non-volatile memory 56 stores, for example, constants, variables and programs for operating the system control unit 50. Reference numerals 60, 62, 64, 66, 68 and 70 denote operation units for inputting various operation instructions of the system control unit 50, and the operation units are each constituted by one or more of a switch, a dial, a touch panel, pointing by line-of-sight detection, a sound recognition device and the like.

A mode dial 60 can switch and set function modes such as power supply off, an automatic shooting mode, a manual shooting mode, a reproduction mode and a PC connection mode. A shutter switch SW1 62 is turned on when a shutter button (not illustrated) is half-pressed, and instructs to start an operation of AF processing, AE processing, AWB processing, EF processing and the like. When the shutter button is fully pressed, a shutter switch SW2 64 is turned on, and instructs to start an operation of a series of processing related to shooting. The series of processing related to shooting refers to exposure processing, development processing, recording processing and the like. In exposure processing, signals read out from the image sensor 14 are written as image data in the memory 30 via the A/D converter 16 and the memory control unit 22. In development processing, development using computation in the image processing unit 20 and the memory control unit 22 is performed. In recording processing, image data is read out from the memory 30, compressed by the compression and decompression unit 32, and written as image data in a recording medium 150 or 160.

An image display ON/OFF switch 66 can set an ON/OFF state of the image display unit 28. This function makes it possible to save power by shutting off the electric current supply to the image display unit 28 constituted by a liquid crystal monitor or the like, when performing shooting using the optical finder 104. A quick review ON/OFF switch 68 sets a quick review function for automatically reproducing shot image data immediately after being shot. The operation unit 70 is constituted by various buttons, a touch panel and the like. The various buttons include a menu button, a flash setting button, a single shooting/continuous shooting/self-timer switch button, an exposure correction button, and the like.

A power supply control unit 80 is constituted by a battery detection circuit, a DC/DC converter, a switch circuit for switching a block to which the power is supplied, and the like. Whether or not a battery is mounted, a battery type and a battery remaining capacity are detected, the DC/DC converter is controlled based on the detection result or an instruction of the system control unit 50, and a necessary voltage is supplied to constituent elements including a recording medium for a necessary period. Connectors 82 and 84 connect, to the camera 100, a power supply unit 86 constituted by a primary battery such as an alkaline battery or a lithium battery and a secondary battery such as an NiCd battery, an NiMH battery or a lithium ion battery, an AC adapter and the like.

Interfaces 90 and 94 each have a function for connecting to a recording medium such as a memory card or a hard disk, and connectors 92 and 96 each physically connect to the recording medium. A recording medium attachment detection unit 98 detects whether or not a recording medium is mounted to the connector 92 or 96. Note that in this embodiment, description is given in which there are two interfaces and two connectors for mounting a recording medium, but there may be one or a plurality of both the interface and the connector. In addition, a configuration may be adopted in which an interface and a connector that are different in standards are combined and provided. Moreover, the camera system and a computer or another peripheral device such as a printer can transfer image data and management information attached to the image data to each other by connecting one of various communication cards such as a LAN card to the interface or the connector.

A communication unit 110 has various communication functions such as wired communication, wireless communication and the like. A connector 112 connects the camera 100 to another device through the communication unit 110, and is an antenna in the case of wireless communication. The recording media 150 and 160 are memory cards, hard disks or the like. The recording media 150 and 160 are provided with recording units 152 and 162 constituted by a semiconductor memory, a magnetic disk or the like, interfaces 154 and 164 to the camera 100, and connectors 156 and 166 that connect to the camera 100, respectively.

Next, the photographing lens 300 will be described. The photographing lens 300 is mechanically and electrically coupled to the camera 100 by a lens mount 306 being engaged with the lens mount 106 of the camera 100. The electrical coupling is realized by the connector 122 and a connector 322 provided respectively for the lens mount 106 and the lens mount 306. A lens 311 includes a focus lens for adjusting the focus distance of the photographing lens 300. The focus control unit 342 performs focus adjustment of the photographing lens 300 by driving the focus lens along the optical axis. The operation of the focus control unit 342 is controlled by the system control unit 50 through a lens system control unit 346. The diaphragm 312 adjusts the amount and the angle of object light that enters the camera 100.

The connector 322 and an interface 338 electrically connects the photographing lens 300 to the connector 122 of the camera 100. The connector 322 then allows the camera 100 and the photographing lens 300 to transmit control signals, state signals, data signals, and the like to each other, and also has a function for allowing electric currents of various voltages to be supplied. The connector 322 may be configured to allow not only electrical communication but also optical communication, voice communication and the like.

A zoom control unit 340 drives a variable magnification lens of the lens 311 so as to adjust the focal distance (angle of view) of the photographing lens 300. If the photographing lens 300 is a single focus lens, the zoom control unit 340 does not exist. The diaphragm control unit 344 controls the diaphragm 312 based on photometric information from the photometry unit 46 in cooperation with the shutter control unit 36 for controlling the shutter 12.

The lens system control unit 346 has a programmable processor such as a CPU or an MPU, for example, and controls overall operations of the photographing lens 300 by executing a program stored in advance. In addition, the lens system control unit 346 has a function of a memory for storing constants, variables, programs and the like for operating the photographing lens. A non-volatile memory 348 stores identification information such as a number unique to the photographing lens, management information, function information such as a maximum aperture value, a minimum aperture value and a focal distance, current and past setting values, and the like.

In this embodiment, lens frame information that is based on the state of the photographing lens 300 is also stored. This lens frame information includes information regarding the radius of a frame opening for determining light flux that passes through the photographing lens and information regarding the distance from the image sensor 14 to the frame opening. The diaphragm 312 is included in the frame for determining light flux that passes through the photographing lens, and in addition, the opening of a lens frame part for holding the lens or the like corresponds to the frame. Moreover, the frame for determining light flux that passes through the photographing lens differs depending on the focus position and the zoom position of the lens 311, and thus a plurality of pieces of lens frame information are provided in correspondence with focus positions and zoom positions of the lens 311. When the camera 100 performs focus detection using a focus detection device, optimum lens frame information corresponding to the focus position and the zoom position of the lens 311 is selected, and sent to the camera 100 through the connector 322.

Hereinabove was described the configuration of the camera system of this embodiment constituted by the camera 100 and the photographing lens 300.

Next, the configuration of the image sensor 14 will be described with reference to FIGS. 2A, 2B and 3.

Figure 2A:
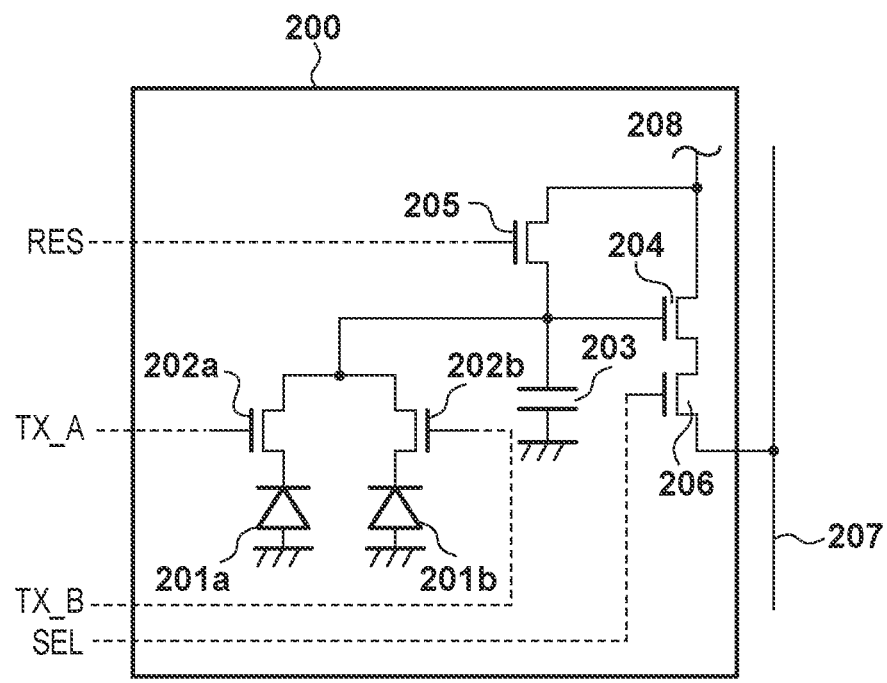
FIGS. 2A and 2B are diagrams showing an exemplary configuration of an image sensor in the embodiments.

FIG. 2A shows an exemplary circuit configuration of a pixel configured to be able to output signals used for focus detection by phase difference detection among a plurality of pixels of the image sensor 14. Here, a configuration will be described in which one pixel 200 is provided with two photodiodes PD 201a and 201b as a plurality of photoelectric conversion areas or photoelectric conversion portions that share a microlens. However, more (for example, four) photodiodes may be provided. The photodiode 201a (a first photoelectric conversion portion) and the photodiode 201b (a second photoelectric conversion portion) function as focus detection pixels, and also function as imaging pixels, as will be described later.

Transfer switches 202a and 202b, a reset switch 205 and a selection switch 206 may be constituted by an MOS transistor, for example. In the following description, these switches are assumed to be an N-type MOS transistor, but may be a P-type MOS transistor, or may be another switching element.

Figure 2B:
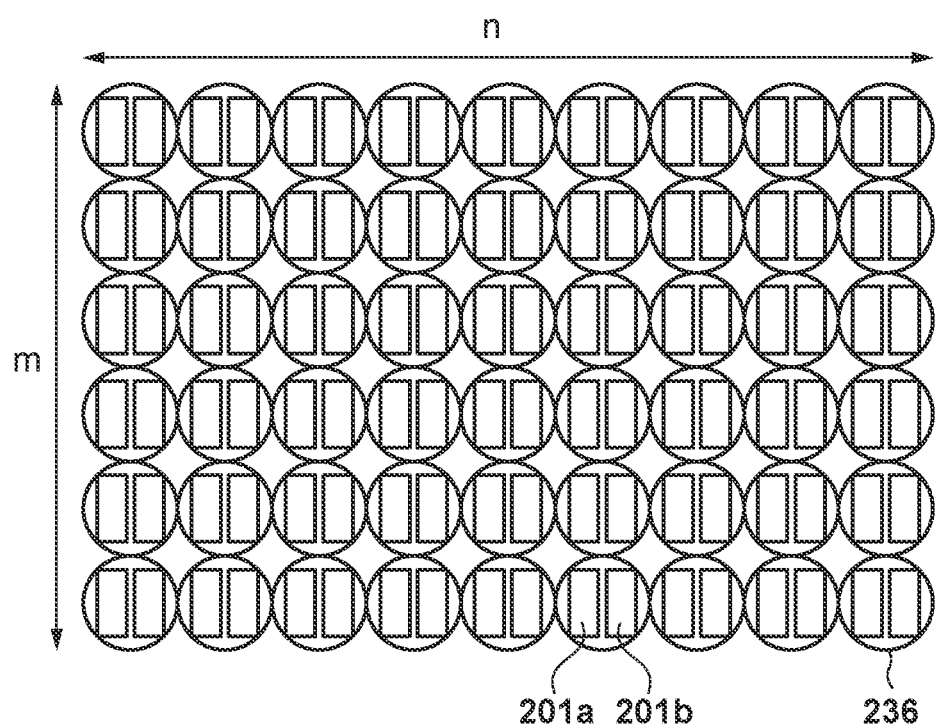

FIG. 2B is a diagram schematically showing n horizontal pixels and m vertical pixels of a plurality of pixels arranged two-dimensionally in the image sensor 14. Here, all the pixels are assumed to have the configuration shown in FIG. 2A. Each pixel is provided with a microlens 236, and the photodiodes 201a and 201b share the same microlens. Hereinafter, a signal obtained from the photodiode 201a is referred to as an A signal or a first signal, and a signal obtained from the photodiode 201b is referred to as a B signal or a second signal. Also, a sequence of signals for focus detection generated from a plurality of A signals is referred to as an A image or first image signals, and a sequence of signals for focus detection generated from a plurality of B signals is referred to as a B image or second image signals. Moreover, a pair of A and B images is referred to as a pair of sequences of signals or pairs of image signals.

The transfer switch 202a is connected between the photodiode 201a and a floating diffusion (FD) 203. Also, the transfer switch 202b is connected between the photodiode 201b and the FD 203. The transfer switches 202a and 202b are elements for respectively transferring, to the common FD 203, electric charges generated in the photodiodes 201a and 201b. The transfer switches 202a and 202b are respectively controlled by control signals TX_A and TX_B.

The floating diffusion (FD) 203 temporarily holds electric charges transferred from the photodiodes 201a and 201b, and functions as an electric charge-voltage conversion unit (capacitor) for converting the held electric charges into voltage signals.

An amplification unit 204 is a source follower MOS transistor. The gate of the amplification unit 204 is connected to the FD 203, and the drain of the amplification unit 204 is connected to a common power supply 208 for supplying a power supply potential VDD. The amplification unit 204 amplifies the voltage signals that are based on the electric charges held in the FD 203, and outputs the amplified voltage signals as image signals.

The reset switch 205 is connected between the FD 203 and the common power supply 208. The reset switch 205 has a function for resetting the potential of the FD 203 to the power supply potential VDD under control of a control signal RES.

The selection switch 206 is connected between the source of the amplification unit 204 and a vertical output line 207. The selection switch 206 is controlled by a control signal SEL, and outputs the image signals amplified by the amplification unit 204 to the vertical output line 207.

Figure 3:
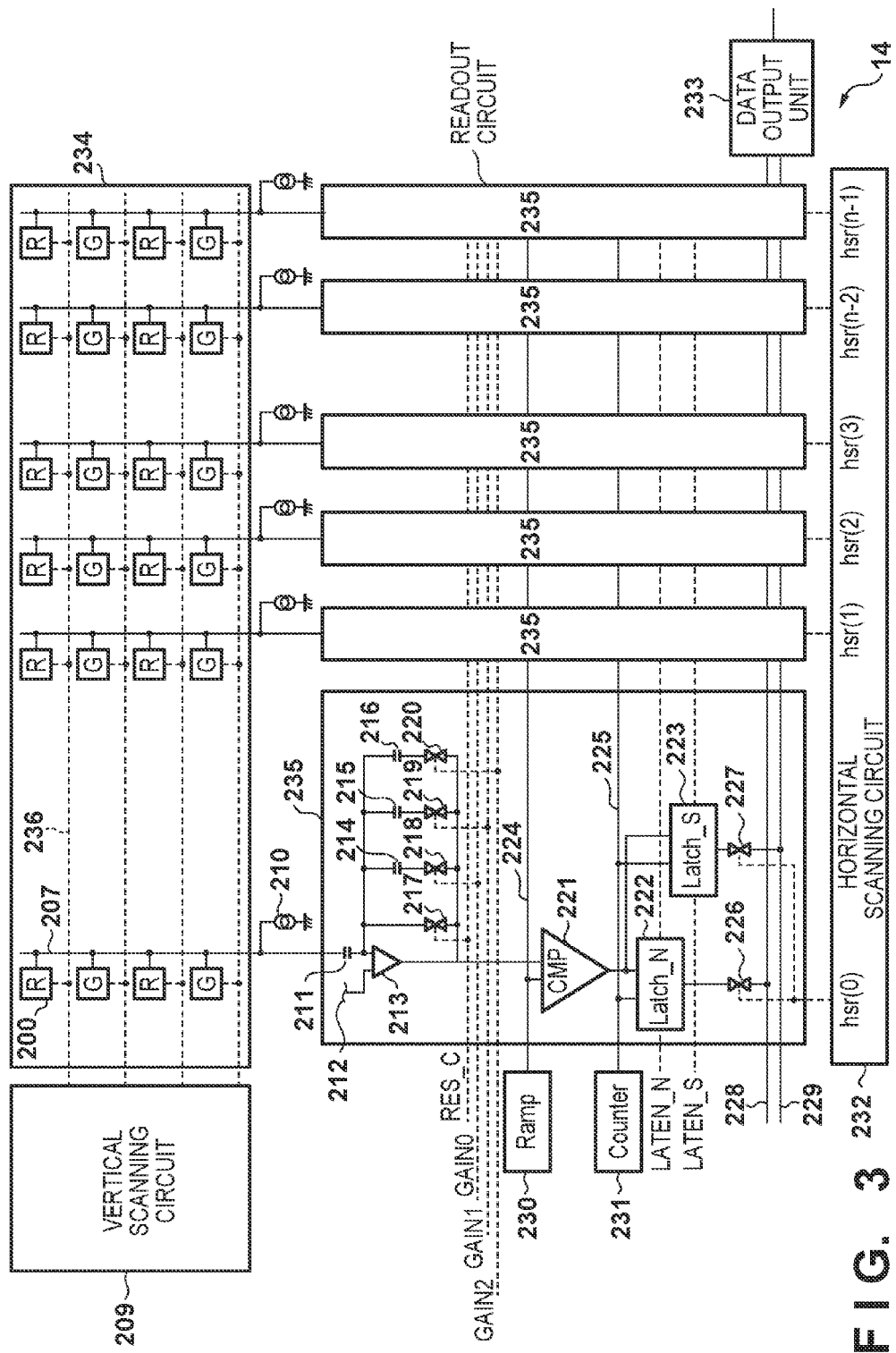
FIG. 3 is a diagram showing an exemplary configuration of the image sensor of the embodiments.

FIG. 3 is a diagram showing an exemplary configuration of the image sensor 14. The image sensor 14 has a pixel array 234, a vertical scanning circuit 209, a current source load 210, readout circuits 235, common output lines 228 and 229, a horizontal scanning circuit 232 and a data output unit 233. In the following description, all the pixels included in the pixel array 234 have the circuit configuration shown in FIG. 2A. However, a portion of the pixels may have a configuration in which one photodiode is provided per microlens.

The pixel array 234 has a plurality of pixels 200 arranged in a matrix. FIG. 3 shows the pixel array 234 of four rows and n columns for ease of description. However, any number of rows and any number of columns of the pixels 200 of the pixel array 234 may be adopted. Also, in this embodiment, the image sensor 14 is a single-plate color image sensor, and has color filters in a primary color Bayer array. Therefore, one of red (R), green (G) and blue (B) color filters is provided for the pixel 200. Note that the colors and arrangement of the color filters are not particularly limited. Moreover, a portion of the pixels included in the pixel array 234 is shielded from light, and forms an optical black (OB) area.

The vertical scanning circuit 209 supplies various types of control signals shown in FIG. 2A to the pixels 200 for each row via a drive signal line 236 provided for each row. Note that in FIG. 3, a single drive signal line 236 is illustrated for each row for simplification, but in practice, there are a plurality of drive signal lines 236 for each row.

The pixels included in the pixel array 234 are connected to the common vertical output line 207 for each column. The current source load 210 is connected to each vertical output line 207. A signal from each of the pixels 200 is input to the readout circuit 235 provided for each column, via the vertical output line 207.

The horizontal scanning circuit 232 outputs control signals hsr(0) to hsr(n−1) each of which corresponds to one readout circuit 235. A control signal hsr( ) selects one of n readout circuits 235. The readout circuit 235 selected by the control signal hsr( ) outputs a signal to the data output unit 233 through the common output lines 228 and 229.

Next, a specific exemplary circuit configuration of the readout circuit 235 will be described. FIG. 3 shows an exemplary circuit configuration of one of n readout circuits 235, but the other readout circuits 235 have the same configuration. The readout circuit 235 of this embodiment includes a ramp A/D converter.

A signal that has been input to the readout circuit 235 via the vertical output line 207 is input to an inverted input terminal of an operational amplifier 213 via a clamp capacitor 211. A reference voltage Vref is supplied from a reference voltage source 212 to a non-inverted input terminal of the operational amplifier 213. Feedback capacities 214 to 216 and switches 218 to 220 are connected between the inverted input terminal and an output terminal of the operational amplifier 213. The switch 217 is further connected between the inverted input terminal and the output terminal of the operational amplifier 213. The switch 217 is controlled by a control signal RES_C, and has a function for causing the two ends of each of the feedback capacities 214 to 216 to short circuit. Also, the switches 218 to 220 are controlled by control signals GAIN0 to GAIN2 from the system control unit 50.

An output signal of the operational amplifier 213 and a RAMP signal 224 that is output from a RAMP signal generator 230 are input to a comparator 221. Latch_N222 is a storage element for holding a noise level (an N signal), and Latch_S223 is a storage element for holding an A signal and a signal level obtained by adding the A signal and a B signal (an A+B signal). Output of the comparator 221 (a value indicating a comparison result) and output (counter value) 225 of a counter 231 are respectively input to Latch_N222 and Latch_S223. Operations of (active or in active) Latch_N222 and Latch_S223 are respectively controlled by LATEN_N and LATEN_S. The noise level held in Latch_N222 is output to the common output line 228 via a switch 226. The signal level held in Latch_S223 is output to the common output line 229 via a switch 227. The common output lines 228 and 229 are connected to the data output unit 233.

The switches 226 and 227 are controlled by a control signal hsr(h) from the horizontal scanning circuit 232. Here, h indicates the column number of the readout circuit 235 to which a control signal line is connected. The signal levels held in Latch_N222 and Latch_S223 of each of the readout circuits 235 are sequentially output to common output lines 228 and 229, and are output to the memory control unit 22 and the image processing unit 20 through the data output unit 233. This operation of sequentially outputting signal levels held in each of the readout circuits 235 to the outside is called horizontal transfer. Note that control signals (except for hsr( )) that are input to a readout circuit as well as control signals of the vertical scanning circuit 209, the horizontal scanning circuit 232, the RAMP signal generator 230 and the counter 231 are supplied from the timing generation circuit 18 and the system control unit 50.

An operation of reading out pixels for one row will be described with reference to FIG. 4 that is a timing chart related to a readout operation of the image sensor 14 shown in FIG. 3. Note that the switches are turned on when the control signals are at H, and the switches are turned off when the control signals are at L.

At a time t1, in the state where the control signal RES is set to H, the vertical scanning circuit 209 changes the control signals TX_A and TX_B from L to H so as to turn on the transfer switches 202a and 202b. Accordingly, electric charges accumulated in the photodiode 201a and 201b are transferred to the common power supply 208 via the transfer switches 202a and 202b and the reset switch 205, and the photodiodes 201a and 201b are reset. The FD 203 is also reset similarly. At a time t2, when the vertical scanning circuit 209 sets the control signals TX_A and TX_B to L so as to turn off the transfer switches 202a and 202b, accumulation of photoelectric charges starts in the photodiodes 201a and 201b.

When a predetermined accumulation time has elapsed, the vertical scanning circuit 209 sets the control signal SEL to H at a time t3 so as to turn on the selection switch 206. Accordingly, the source of the amplification unit 204 is connected to the vertical output line 207. At a time t4, the vertical scanning circuit 209 sets the control signal RES to L so as to turn off the reset switch 205. Accordingly, reset of the FD 203 is released, and the reset signal level of the FD 203 is read out to the vertical output line 207 via the amplification unit 204, and is input to the readout circuit 235.

After that, at a time t5, the timing generation circuit 18 sets the control signal RES_C to L. Accordingly, the switch 217 is turned on, and a voltage that is based on the difference between the reset signal level read out to the vertical output line 207 and the reference voltage Vref is output from the operational amplifier 213. Setting for the system control unit 50 setting one of the control signals GAIN0 to GAIN2 to H is performed based on the ISO sensitivity set using the operation unit 70, in the image sensor 14 in advance. For example, if any one of ISO sensitivities 100, 200 and 400 can be set in the camera 100 of the embodiment, in the case of the ISO sensitivity 100, the control signal GAIN0 is set to H, and the control signals GAIN1 and GAIN2 are set to L. Similarly, in the case of the ISO sensitivity 200, the control signal GAIN1 is set to H, and in the case of the ISO sensitivity 400, the control signal GAIN2 is set to H. Note that the type of sensitivity that is set and the relationship between a sensitivity that is set and a control signal are not limited to those described above.

The operational amplifier 213 amplifies a voltage that has been input, with an inverted gain determined based on the capacitance ratio of the clamp capacitor 211 to one of the feedback capacities 214 to 216 corresponding to a switch corresponding to a control signal that is at H among the control signals GAIN0 to GAIN2, and outputs the amplified voltage. This amplification also amplifies a random noise component that occurs in the circuits up to the operational amplifier 213. Therefore, the magnitude of the random noise included in the amplified signal depends on the ISO sensitivity.

Next, at a time t6, the RAMP signal generator 230 starts outputting RAMP signals whose signal level increases linearly over time, and at the same time, the counter 231 starts counting up from a reset state. In addition, the timing generation circuit 18 sets LATEN_N to H, and activates Latch_N. The comparator 221 compares an output signal of the operational amplifier 213 with a RAMP signal that is output by the RAMP signal generator 230. When the RAMP signal level exceeds the output signal level of the operational amplifier 213, output of the comparator 221 changes from L to H (at a time t7). When the output of the comparator 221 changes from L to H in the state where LATEN_N is at H, Latch_N222 stores the counter value that is being output by the counter 231 at that point. The counter value stored in Latch_N222 is equivalent to a digital value (N signal data) indicating an N signal level. Note that LATEN_S is at L, and thus Latch_S223 is inactive, and does not store the count value. After that, at a time t8, when the RAMP signal level reaches a predetermined value, the RAMP signal generator 230 stops outputting RAMP signals, and the timing generation circuit sets LATEN_N to L.

At a time t9, the vertical scanning circuit 209 sets the control signal TX_A to H. Accordingly, the transfer switch 202a is turned on, and from the time t2, photoelectric charges (A signals) accumulated in the photodiode 201a are transferred to the FD 203. After that, at a time t10, the vertical scanning circuit 209 sets the control signal TX_A to L. The FD 203 converts the transferred electric charges into a potential, and this potential (an A signal level) is output to the readout circuit 235 via the amplification unit 204 and the vertical output line 207. The operational amplifier 213 outputs the A signal level read out to the vertical output line 207 and a voltage that is based on the difference from the reference voltage Vref. An inverted gain of the operational amplifier 213 is determined based on the rate of the clamp capacitor 211 to one of the feedback capacities 214 to 216.

Next, at a time t11, the RAMP signal generator 230 starts outputting RAMP signals, and at the same time, the counter 231 start counting up from the reset state. Also, the timing generation circuit 18 sets LATEN_S to H, and activates Latch_S. The comparator 221 compares an output signal of the operational amplifier 213 with a RAMP signal that is output from the RAMP signal generator 230. When the RAMP signal level exceeds the output signal level of the operational amplifier 213, output of the comparator 221 changes from L to H (at a time t12). When the output of the comparator 221 changes from L to H in a state where LATEN_S is at H, Latch_S223 stores the counter value that is being output by the counter 231 at that point. The counter value stored in Latch_S223 is equivalent to a digital value (A signal data) indicating an A signal level. Note that LATEN_N is at L, and thus Latch_N222 is inactive, and does not store the count value. After that, at a time t13, when the RAMP signal level reaches a predetermined value, the RAMP signal generator 230 stops outputting RAMP signals, and the timing generation circuit sets LATEN_S to L.

After that, during a period from a time t14 to a time t15, the horizontal scanning circuit 232 sequentially sets the control signals hsr(h) to be at H for a certain period individually. Accordingly, the switches 226 and 227 of each of the readout circuits 235 are on for the certain period, and return to an off state. N signal data and A signal data held in Latch_N222 and Latch_S223 of each of the readout circuits 235 are respectively read out to the common output lines 228 and 229, and are input to the data output unit 233. The data output unit 233 outputs a value obtained by subtracting the N signal data from the A signal data to the outside, regarding the A signal data and the N signal data that have been output from each of the readout circuits 235.

For a period from a time t16 to t17, the vertical scanning circuit 209 sets the control signals TX_A and TX_B to H, and turns on the transfer switches 202a and 202b. Accordingly, photoelectric charges are transferred from both the photodiodes 201a and 201b to the FD 203. The FD 203 converts the transferred electric charges into a potential, and this potential (A+B signal level) is output to the readout circuit 235 via the amplification unit 204 and the vertical output line 207. The operational amplifier 213 outputs a voltage that is based on the difference between the A+B signal level read out to the vertical output line 207 and the reference voltage Vref.

Next, at a time t18, the RAMP signal generator 230 starts outputting RAMP signals, and at the same time, the counter 231 starts counting up from the reset state. The timing generation circuit 18 sets LATEN_S to H, and activates Latch_S. The comparator 221 compares an output signal of the operational amplifier 213 with a RAMP signal that is output by the RAMP signal generator 230. When the RAMP signal level exceeds the output signal level of the operational amplifier 213, output of the comparator 221 changes from L to H (at a time t19). When the output of the comparator 221 changes from L to H in the state where LATEN_S is at H, Latch_S223 stores the counter value that is being output by the counter 231 at that point. The counter value stored in Latch_S223 is equivalent to a digital value (A+B signal data) indicating an A+B signal level. After that, at a time t20, when the RAMP signal level reaches a predetermined value, the RAMP signal generator 230 stops outputting RAMP signals, and the timing generation circuit sets LATEN_S to L.

After that, for a period from a time t21 to a time t22, the horizontal scanning circuit 232 sequentially sets the control signals hsr(h) to H for a certain period individually. Accordingly, the switches 226 and 227 of each of the readout circuits 235 are on for the certain period, and return to the off state. N signal data and A+B signal data stored in Latch_N222 and Latch_S223 of each of the readout circuits 235 are respectively read out to the common output lines 228 and 229, and are input to the data output unit 233. The data output unit 233 outputs a value acquired by subtracting the N signal data from the A+B signal data to the outside, regarding the A+B signal data and the N signal data that have been output from each of the readout circuits 235.

The operation of reading out one row is complete when the timing generation circuit 18 sets the control signal RES_C to H at a time t23, the vertical scanning circuit 209 sets the control signal RES to H at a time t24 and the vertical scanning circuit 209 sets the control signal SEL to L at a time t25. Image signals for one screen are obtained by repeating this operation for a predetermined number of rows.

The camera 100 of this embodiment has a still image mode and a moving image mode. If the still image mode is set, the system control unit 50 performs control so as to read out pixel data for all the rows from the image sensor 14. Also, if the moving image mode is set, the system control unit 50 performs control so as to read out pixel data from the image sensor 14 in a three-row cycle (one row is read and two rows are skipped), for example. Accordingly, in this embodiment, the number of rows that are read out is smaller in the moving image mode than in the still image mode. However, read out methods in the still image mode and the moving image mode are not limited thereto.

It is possible to read out A signals and A+B signals from which reset noise has been removed, from the image sensor 14 in this manner. The A signals are used as focus detection signals, and the A+B signals are used as signals constituting a shot image. The A+B signals and the A signals are also used for generating B signals for focus detection.

Note that the image sensor 14 of this embodiment has two types of readout modes, namely, an all-pixel readout mode and a thinning-readout mode. The all-pixel readout mode is a mode for reading out all the effective pixels, and is set when obtaining a high definition still image, for example.

The thinning-readout mode is a mode for reading out less pixels than in the all-pixel readout mode, and is set, for example, in the case of obtaining pixels having lower resolution than that of a high definition still image such as a moving image or an image for preview, and in the case where it is necessary to perform high speed readout. For example, it is possible to thin and readout pixels at the same ratio both in the horizontal direction and the vertical direction not to change the aspect ratio of the image. Note that "thinning" is not only skipping readout itself, but includes a configuration for discarding (ignoring) signals that have been read out, and a configuration for generating one signal from a plurality of signals that have been read out. For example, S/N can be improved by averaging signals read out from a plurality of adjacent pixels and generating one signal.

Figure 5A:
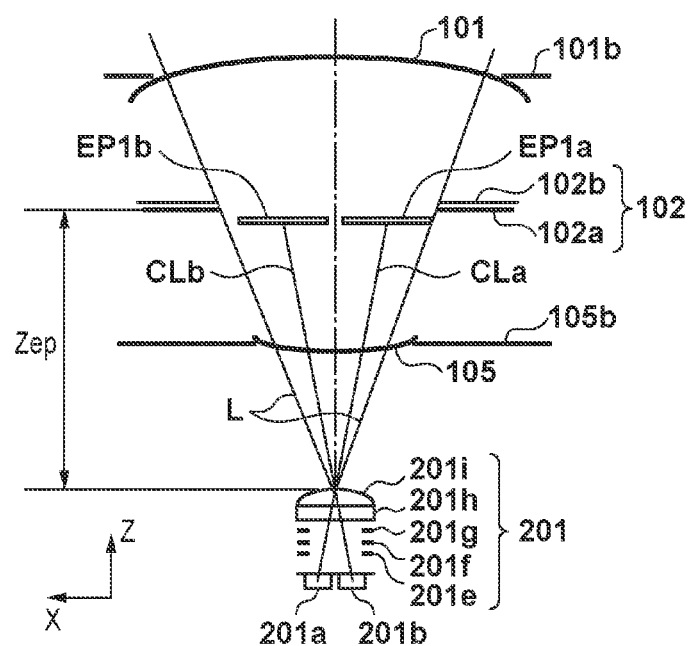
FIGS. 5A and 5B are diagrams showing an example of the relationship between photoelectric conversion areas and an exit pupil in the embodiments.

FIG. 5A is a diagram illustrating, in the image capture apparatus of this embodiment, the conjugate relation between the exit pupil plane of the photographing lens 300 and the photoelectric conversion portions 201a and 201b of the pixel 200 (central pixel) arranged in the vicinity of the center of the imaging plane of the image sensor 14. The photoelectric conversion portions 201a and 201b in the image sensor 14 and the exit pupil plane of the photographing lens 300 are designed to have conjugate relation using an on-chip microlens 201i. In general, the exit pupil plane of the photographing lens 300 substantially matches a plane on which an iris diaphragm for light amount adjustment is provided.

Figure 5B:
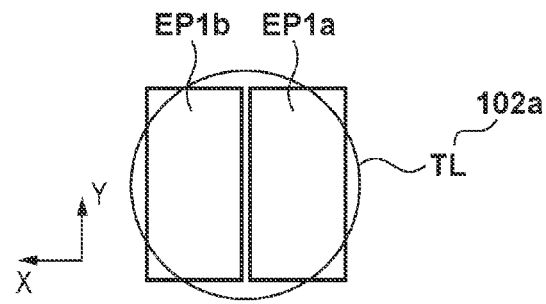

On the other hand, the photographing lens 300 of this embodiment is a zoom lens that has a magnification function. In some zoom lenses, the size of the exit pupil and the distance (exit pupil distance) from the image plane to the exit pupil change when a magnification operation is performed. FIGS. 5A and 5B show a state where the focal distance of the photographing lens 300 is at the center between the wide-angle end and the telephoto end. An exit pupil distance Zep in this state is used as a standard value to optimally design an eccentricity parameter that is based on the shape of the on-chip microlens and the image height (the distance from the screen center or XY coordinates).

In FIG. 5A, the photographing lens 300 has a first lens group 101, a lens barrel member 101b that holds the first lens group, a third lens group 105, and a lens barrel member 105b that holds the third lens group. The photographing lens 300 also has a diaphragm 102, an aperture plate 102a for determining an opening diameter when the diaphragm is open, and a diaphragm blade 102b for adjusting an opening diameter when narrowing the diaphragm. Note that in FIGS. 5A and 5B, 101b, 102a, 102b, and 105b functioning as restriction members that restrict light flux that passes through the photographing lens 300 indicate optical virtual images when observed from the image plane. In addition, a synthetic aperture in the vicinity of the diaphragm 102 is defined as the exit pupil of the photographing lens 300, and the distance from the image plane is defined as the exit pupil distance Zep.

The photoelectric conversion portions 201a and 201b are arranged on the lowest layer of the pixel 200. The wiring layers 201e to 201g, a color filter 201h and the on-chip microlens 201i are provided on layers above the photoelectric conversion portions 201a and 201b. The photoelectric conversion portions 201a and 201b are projected on the exit pupil plane of the photographing lens 300 by the on-chip microlens 201i. In other words, the exit pupil is projected on the surfaces of the photoelectric conversion portions 201a and 201b via the on-chip microlens 201i.

FIG. 5B shows projected images EP1a and EP1b of the photoelectric conversion portions 201a and 201b on the exit pupil plane of the photographing lens 300. A circle TL indicates a maximum incident range of light flux in the pixel 200 defined by the aperture plate 102a of the diaphragm 102, on the exit pupil plane. The circle TL is defined by the aperture plate 102a, and thus the circle TL is also denoted by 102a in the figure. FIGS. 5A and 5B show a central pixel, and thus vignetting of the light flux is symmetrical relative to the optical axis, and the photoelectric conversion portions 201a and 201b receive light flux that has passed through pupil areas of the same size. In addition, the circle TL includes a large portion of the projected images EP1a and EP1b, and thus substantially no vignetting of the light flux occurs. Therefore, if signals that have undergone photoelectric conversion in the photoelectric conversion portions 201a and 201b are added, a result of performing photoelectric conversion on light flux that has passed through the circle TL, namely, substantially the entire exit pupil area is obtained. An area of the exit pupil in which the photoelectric conversion portion 201a receives light is called a first pupil area, an area of the exit pupil in which the photoelectric conversion portion 201b receives light is called a second pupil area, and an area obtained by combining the first pupil area and the second pupil area is called a third pupil area.

Accordingly, the image sensor 14 of this embodiment has a function of a focus detection sensor for phase difference AF in addition to a function for obtaining a shot image. Note that, as described above, signals obtained from a plurality of photoelectric conversion portions can be used as output of normal imaging pixels if the signals are put together by pixels, and thus it is also possible to perform contrast AF using output of the image sensor 14 (image capturing signals).

Figure 6:
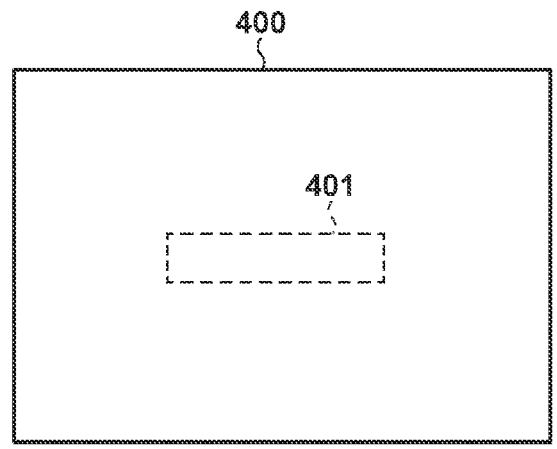
FIG. 6 is a diagram showing an example of a shooting range and a focus detection area in the embodiments.

FIG. 6 is a diagram showing a focus detection area 401 within a shooting range 400, and phase difference detection AF is performed in this focus detection area (a focus detection sensor on the imaging plane (on the light receiving plane)) by the image sensor 14.

FIG. 6 is a diagram showing an example of the focus detection area 401 set in the shooting range 400. In the case of performing focus detection using output of pixels of the image sensor 14, output of pixels included in the area of the image sensor 14 corresponding to the focus detection area 401 are used for both focus detection by contrast detection and focus detection by phase difference detection. Therefore, it can also be said that the focus detection area 401 is set in the image sensor 14, and for ease of description and understanding, the focus detection area 401 will be described below as a pixel area of the image sensor 14. In addition, in the focus detection area 401, the pixels 200 having the configuration shown in FIG. 2A are assumed to be arranged in one row and 4N columns. Note that this is merely illustrative, and the number of focus detection areas and the size of the focus detection area (the number of pixels included therein) can be determined as appropriate in a range in which phase difference detection is not interfered with.

Figure 7:
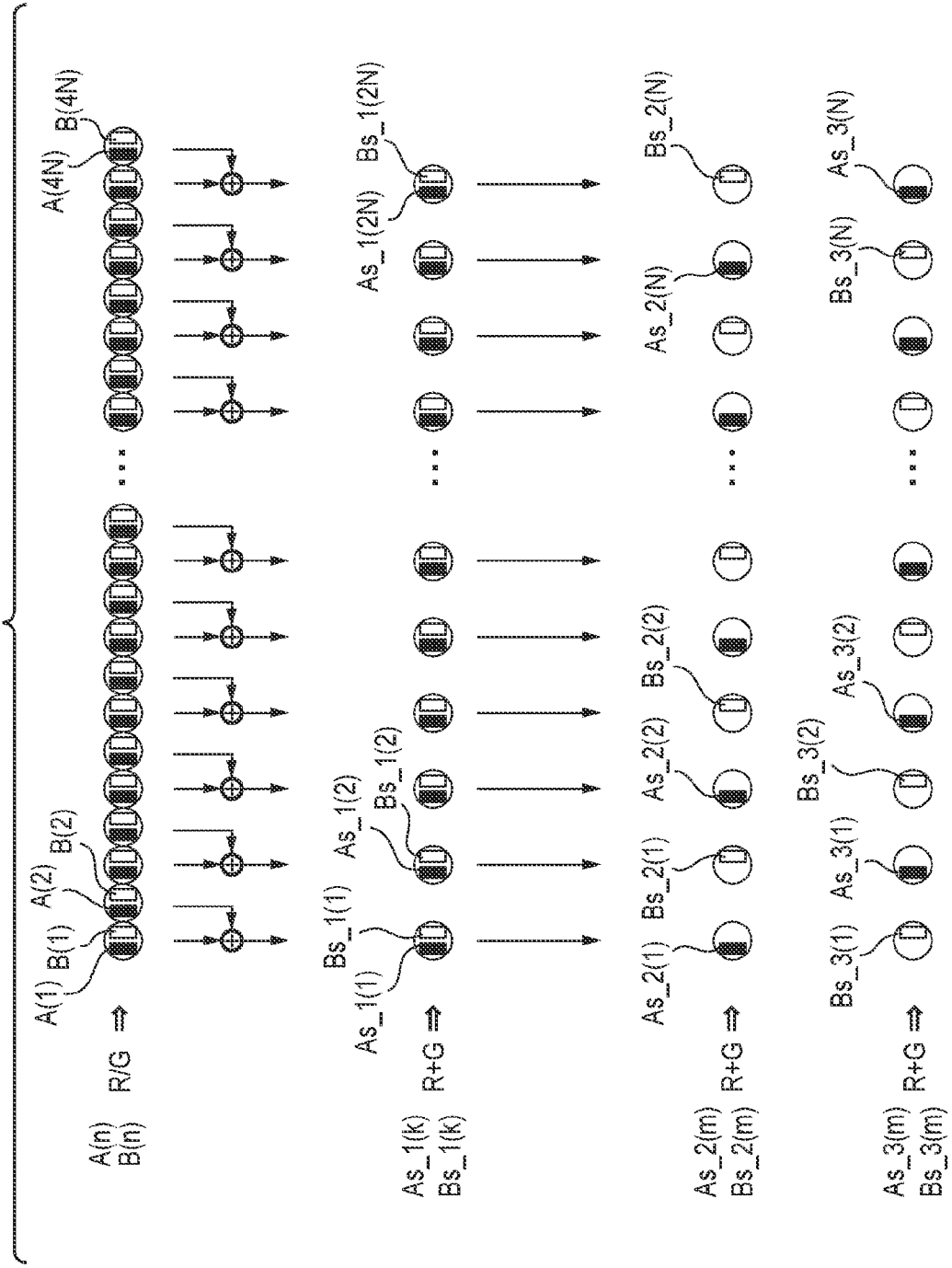
FIG. 7 is a diagram schematically showing an example of a method for generating pairs of image signals in a first embodiment.

FIG. 7 schematically shows the pixels 200 of one row and 4N columns arranged within the focus detection area 401 and signals obtained from the pixels 200. Hereinafter, a pixel (the photodiode 201a) and output thereof, the pixel being in an i-th row and a j-th column and being used for generating a signal of an A image for AF, are denoted by A(i,j). Similarly, a pixel (the photodiode 201b) and output thereof, the pixel being in the i-th row and the j-th column and being used for generating a signal of a B image for AF, are denoted by B(i,j). Note that in FIG. 7, the number of rows is 1, and thus indication of "i" is omitted. Therefore, A(1,j) and B(1,j) in the following description correspond to A(j)B(j) in FIG. 7.

In focus detection by phase difference detection, a pair of images having a portion corresponding to the same object is generated, the phase difference of the pair of images is detected, and the phase difference is converted into a defocus amount and direction. A sequence of signals (an A image) that is based on A signals obtained from the photodiodes 201a of a plurality of pixels 200 that exist in a predetermined direction (for example, the horizontal direction) and a sequence of signals (a B image) that is based on B signals obtained from the photodiodes 201b of the pixels 200 are equivalent to images of the same object when viewed from different viewpoints. Therefore, focus detection by phase difference detection can be realized by detecting the phase difference between the A and B images, and converting the phase difference into a defocus amount and direction.

A value (correlation amount) indicating the correlation between the A and B images at each position is then computed while changing the relative distance (shift amount) between the A and B images in the above-described predetermined direction, and a shift amount at which the correlation is maximized can be detected as the phase difference between the A and B images. For example, the correlation amount may be the difference accumulation value of corresponding signal values, but may be another value.

For example, in the example in FIG. 7, the A image is generated from A(1) to A(4N), and the B image is generated from B(1) to B(4N), and if a shift amount k is changed in units of pixels in the range of −kmax≤k≤kmax, a correlation amount COR(k) at each relative position can be computer as follows.

$$COR(k) = \sum_{i=1}^{4N-1-2 \times kmax} |A(i-k) - B(i+k)| \quad\quad 1$$

$$(-kmax \le k \le kmax)$$

The value of the shift amount k that minimizes COR(k) is then obtained. Here, the shift amount k computed in Expression 1 is an integer, but in order to improve the resolution, the shift amount k obtained lastly is a real number. For example, if the minimum value obtained with Expression 1 is COR(a), a shift amount that minimizes the correlation amount in this section, and that is a real number value is obtained by performing interpolation computation from COR(a−1), COR(a) and COR(a+1), or the like.

Here, a problem that can occur with a correlation amount obtained in the case where B signals are generated from A+B signals and A signals will be described. Here, an A image generated from A(1) to A(4N) is denoted by S[A], an A+B image generated from A+B(1) to A+B(4N) is denoted by S[A+B]. Also, random noise superimposed when A(1) to A(4N) are read out is denoted by N[A], and random noise superimposed when A+B(1) to A+B(4N) are read out is denoted by N[A+B]. The random noise is caused by the readout circuit.

A B image generated from the A+B image and the A image can be expressed with Expression 2 below.

$$B \text{ image} = \quad\quad 2$$
$$A+B \text{ image} - A \text{ image} = (S[A+B] + N[A+B]) - (S[A] + N[A]) =$$
$$(S[A+B] - S[A]) + (N[A+B] - N[A])$$

At this time, a correlation amount COR(s) when the shift amount k=s (s≠0) can be expressed with Expression 3 below.

$$COR(s) = \quad\quad 3$$
$$\Sigma|A(i-s) - B(i+s)| = \Sigma|\{S[A(i-s)] + N[A(i-s)]\} - \{S[A+B(i+s)] -$$
$$S\{A(i+s)\} + N[A+B(i+s)] - N[A(i+s)]\}| =$$
$$\Sigma|\{S[A(i-s)] + S[A(i+s)] - S[A+B(i+s)] + N[A(i-s)] +$$
$$N[A(i+s)] - N[A+B(i+s)]\}|$$

On the other hand, a correlation amount COR (0) when the shift amount k=0 can be expressed with Expression 4 below.

$$COR(0) = \Sigma |A(i) - B(i)| = \quad 4$$

$$\Sigma |S[A(i)] + S[A(i)] - S[A+B(i)] + N[A(i)] + N[A(i)] - N\{A+B(i)\}| =$$

$$\Sigma |2 \times S[A(i)] - S[A+B(i)] + 2 \times N[A(i)] - N[A+B(i)]| \quad 5$$

Here, a random noise component Noise(s) when the shift amount k=s(≠0) and a random noise component Noise(0) when the shift amount k=0, the random noise components Noise(s) and Noise(0) being included in the correlation amount COR, can be respectively expressed with Expressions 5 and 6 below. If the shift amount k=s(≠0):

$$\text{Noise}(s)=\Sigma |N[A(i-s)]+N[A(i+s)]-N[A+B(i+s)]| \quad 5$$

If the shift amount k=0:

$$\text{Noise}(0)=\Sigma |2 \times N[A(i)] - N[A+B(i)]| \quad 6$$

Here, N[A(i−s)], N[A(i+s)] and N[A+B(i+s)] that constitute Noise(s) are random noise that are not correlated with each other. Therefore, Noise(s) takes a substantially fixed value. On the other hand, N[A(i)] and N[A+B(i)] that constitute Noise(0) are random noise that are not correlated with each other, but N[A(i)] is doubled, and thus Noise(0) is larger than Noise(s). Therefore, when the relationship between the shift amount k and noise(k) is schematically described, noise components that occupies the correlation amount is large only when the shift amount k=0, as in FIG. 11A.

Random noise whose absolute value is equal to random noise superimposed on the A image and whose sign is inverted from that of the random noise superimposed on the A image is superimposed on the B image generated by subtracting the A image from the A+B image. In this manner, the B image generated by subtracting the A image from the A+B image includes random noise correlated to the random noise superimposed on the A image. Therefore, the correlation of random noise between the A and B images is specifically high when the shift amount k=0. In computation of the correlation amount COR (0) when the shift amount k=0, noise components of |2×N[A(i)]| included in respective differences between signals are integrated, and a peak of Σ|2×N[A(i)]| occurs.

Figure 11A:
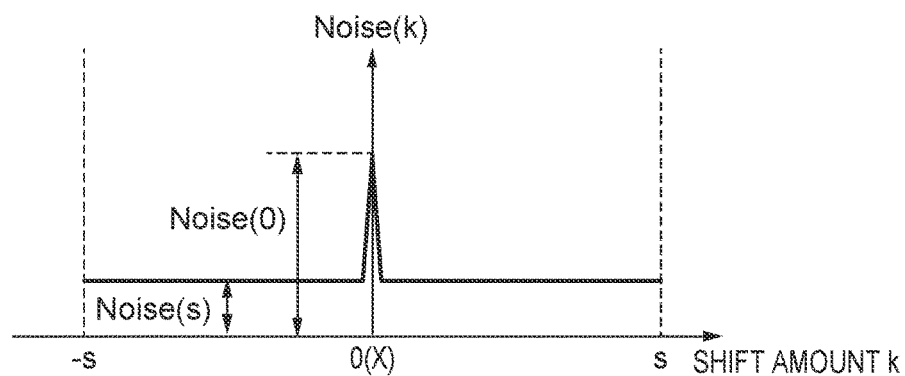
FIGS. 11A to 11C are diagrams schematically showing the influence of a correlated noise component on computation of a correlation amount.
Figure 11B:
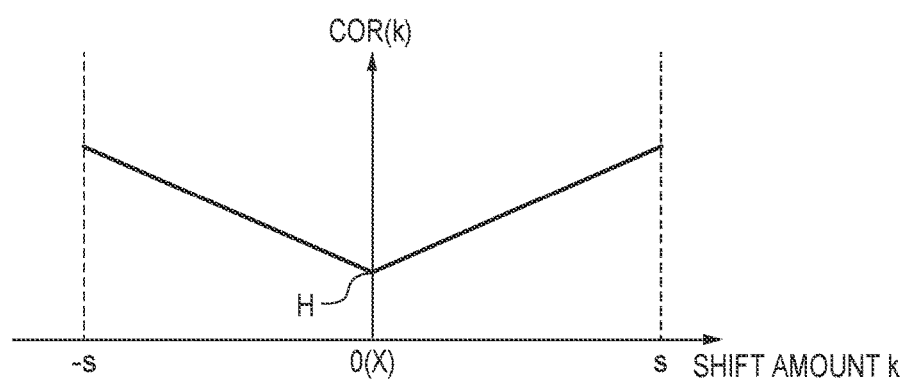
Figure 11C:
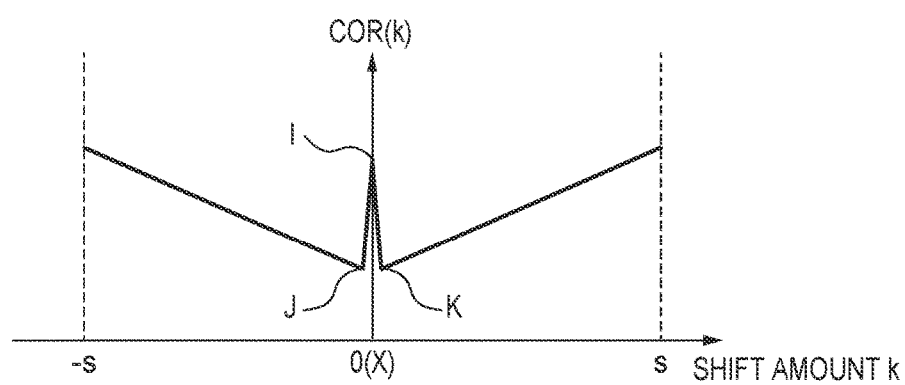

If the object contrast is low, or the environment luminance is low, the S/N ratio of an obtained image deteriorates, and thus noise components included in a correlation amount COR of the A image and the B image is large. For example, assume a state in which an object is in focus when the shift amount k=0. In this case, if there is no influence of noise, the value of the correlation amount COR(k) for the shift amount k changes as shown in FIG. 11B, and it is possible to correctly detect the shift amount k (=0) at a point H at which the correlation amount COR(k) is minimized (the correlation is maximized). On the other hand, if the noise component has a peak when the shift amount k=0 as shown in FIG. 11A, the value of the correlation amount COR(k) for the shift amount k changes as shown in FIG. 11C. In this case, the correlation amount COR(k) is maximized (a point I) when the shift amount k=0, and thus it is not possible to correctly detect the shift amount that should be detected. Furthermore, COR(k) is minimized at two locations (points J and K) in the vicinity of the shift amount k (=0), thus these points are recognized as shift amounts of an in-focus position, and there arises a problem that error detection and hunting (the focus lens shifts repeatedly in reciprocation) occur.

The noise amount included in the B image generated by subtracting the A image from the A+B image is negatively correlated to the noise amount included in the A image. However, even if the noise amounts included in the A and B images are positively correlated, a problem occurs. For example, there is variation in sensitivity of pixels due to the transmissivity of the color filters of the pixels, variation in property of readout circuits and the like. Therefore, the A image and the A+B image read out from the same pixels share the source of the noise. In this case, the larger the signal amount is, the larger the noise amount becomes, and thus the noise amounts of the A image and the A+B image are different according to the difference in signal amount.

The A image is expressed as S[A], and a noise component whose value differs among pixels is expressed as N[A]. In this case, it is assumed that only a noise component positively correlated to the signal amount occurs in the A image and the A+B image. If the signal amount of the A+B image S[A+B] is expressed as g×S[A] (g≥1) as a relative amount for the signal amount of the A image S[A], a noise amount N[A+B] of the A+B image can be expressed as g×N[A] as a relative amount for a noise amount N[A] of the A image.

In this case, the B image obtained by subtracting the A image from the A+B image can be expressed by Expression 7 below.

$$B \text{ image}=(S[A+B]+N[A+B])-(S[A]+N[A])=(g-1)(S[A]+N[A]) \quad 7$$

If the correlation amount COR(k) of the A and B images is computed in accordance with Expression 1, the noise amount Noise(s) when the shift amount k=s(≠0) and the noise amount Noise(0) when the shift amount k=0 can be respectively expressed with Expressions 8 and 9 below.

If the shift amount k=s (≠0):

$$\text{Noise}(s)=\Sigma |N[A(i-s)]-(g-1) \times N[A(i+s)]| \quad 8$$

If the shift amount k=0:

$$\text{Noise}(0)=\Sigma |(2-g) \times N[A(i)]| \quad 9$$

Here, N[A(i−s)] and N[A(i+s)] that constitute Noise(s) are random noise having the same variation as N[A] and not correlated to each other. Therefore, N[A(i−s)]−(g−1)×N[A(i+s)] has a larger variation than N[A(1)]. Noise(0) obtained by integrating variation of N[A] is frequently smaller than Noise(s) obtained by integrating this variation.

In focus detection by phase difference detection, a defocus state is detected by detecting the shift amount k that minimizes the correlation amount COR(k) (maximizes the correlation). Therefore, the correlation amount of a noise component when the shift amount k=0 being smaller than with another shift amount can cause the shift amount k (=0) to be erroneously detected as a shift amount that minimizes the correlation value COR(k). If the difference in signal amount between the A image and the A+B image is large, this problem easily occurs in an image of an object whose contrast is low and that is uniformly bright, for example. In addition, if the color and brightness of the object are uniform, focus detection by phase difference detection is basically impossible, but there is a possibility that a defocus amount and direction that are based on a shift amount at which the correlation amount of noise components is minimized are detected.

Also in this embodiment, an A (or B) signal is generated from an A+B signal and a B (or A) signal read out from the same pixel. Therefore, noise components of the A signal and the B signal corresponding to the same pixel are negatively or positively correlated. However, in order to suppress the deterioration in focus detection accuracy due to the above-described correlation of the noise components of A and B images taking a specific value at a specific shift amount, various types of A images and B images are generated from A signals and B signals, and are used for correlation computation.

Specifically, in this embodiment, correlation amounts are computed for a plurality of pairs of A and B images (As_1 and Bs_1, As_2 and Bs_2, and As_3 and Bs_3). Note that for the purpose of a reduction in computation load, improvement in the S/N ratio of output signals, adjustment of an output image size, and the like, a sequence of signals is generated from addition pixel signals obtained by adding output of a plurality of pixels (here, two pixels).

Here, each of the signals constituting a first A image As_1 generated from the pixels in an i-th row is denoted by As_1(i,k), and each of the signals constituting a first B image Bs_1 is denoted by Bs_1(i,k) (k is a signal number of a signal constituting a sequence of signals). In this case, As_1(1,k) and Bs_1(1,k) for pixels in one row and 4N columns shown in FIG. 7 can be expressed with Expression 10 below.

$$As\_1(1,k)=A(1,2\times(k-1)+1)+A(1,2\times(k-1)+2)$$

$$Bs\_1(1,k)=B(1,2\times(k-1)+1)+B(1,2\times(k-1)+2)$$

$$(1\leq k\leq 2N, \text{ where } k \text{ is an integer}) \qquad 10$$

Accordingly, the first A image As_1 and the first B image Bs_1 are each constituted by 2N signals obtained by adding output of two pixels of the same type adjacent in the horizontal direction, such as addition output of a first pixel and a second pixel, and addition output of a third pixel and a fourth pixel.

Also, each of the signals constituting a second A image As_2 generated from the pixels in the i-th row is denoted by As_2(i,m), and each of the signals constituting a second B image Bs_2 is denoted by Bs_2(i,m) (m is a signal number of a signal constituting a sequence of signals). In this case, As_2(1,m) and Bs_2(1,m) for the pixels of one row and 4N columns in FIG. 7 can be expressed as Expression 11 below.

$$As\_2(1,m)=As\_1(1,2m-1)$$

$$Bs\_2(1,m)=Bs\_1(1,2m)$$

$$(1\leq m\leq N) \qquad 11$$

Furthermore, each of the signals constituting a third A image As_3 generated from the pixels in the i-th row is denoted by As_3(i,m), and each of the signals constituting a third B image Bs_3 is denoted by Bs_3(i,m) (m is a signal number of a signal constituting a sequence of signals). In this case, As_3(1,m) and Bs_3(1,m) for the pixels of one row and 4N columns shown in FIG. 7 can be expressed with Expression 12 below.

$$As\_3(1,m)=As\_1(1,2m)$$

$$Bs\_3(1,m)=Bs\_1(1,2m-1)$$

$$(1\leq m\leq N) \qquad 12$$

In this manner, the second A image As_2 is constituted by odd-numbered signals constituting the first A image As_1, and the second B image Bs_2 is constituted by even-numbered signals constituting the first B image Bs_1. Also, the third A image As_3 is constituted by even-numbered signals constituting the first A image As_1, and the third B image Bs_3 is constituted by odd-numbered signals constituting the first B image Bs_1. In other words, the position of the object is shifted in the phase difference detection direction by half a sampling pitch, between the second A image As_2 and the second B image Bs_2, and between the third A image As_3 and the third B image Bs_3.

Accordingly, a pixel group used for generating the second A image As_2 and a pixel group used for generating the second B image Bs_2 are different from each other. Therefore, the correlation between the noise component of the second A image As_2 and the noise component of the second B image Bs_2 is low. The same applies to the third A image As_3 and the third B image Bs_3. Therefore, it is possible to suppress problems due to the correlation of noise component between the A and B images taking a specific value at a specific shift amount, by computing the correlation amount COR(k) using the second A image As_2 and the second B image Bs_2, and the third A image As_3 and the third B image Bs_3.

As described above, in this embodiment, a correlation amount is computed for a pair of sequences of signals (the first A image As_1 and the first B image Bs_1) whose noise components are correlated to each other, based on the output signals of a first pixel group. Also, a correlation amount is computed for a pair of sequences of signals (the second A image As_2 and the second B image Bs_2) that is based on output signals of a second pixel group and a third pixel group constituting the first pixel group. Furthermore, a correlation amount is computed for another pair of sequences of signals (the third B image Bs_3 and the third A image As_3) that is based on output signals of the second pixel group and the third pixel group. Note that, here, as an example in which the correlation of noise components is minimized, the second pixel group and the third pixel group are assumed not to overlap, but partial overlapping is not excluded.

Focus Detection Operation

Figure 8:
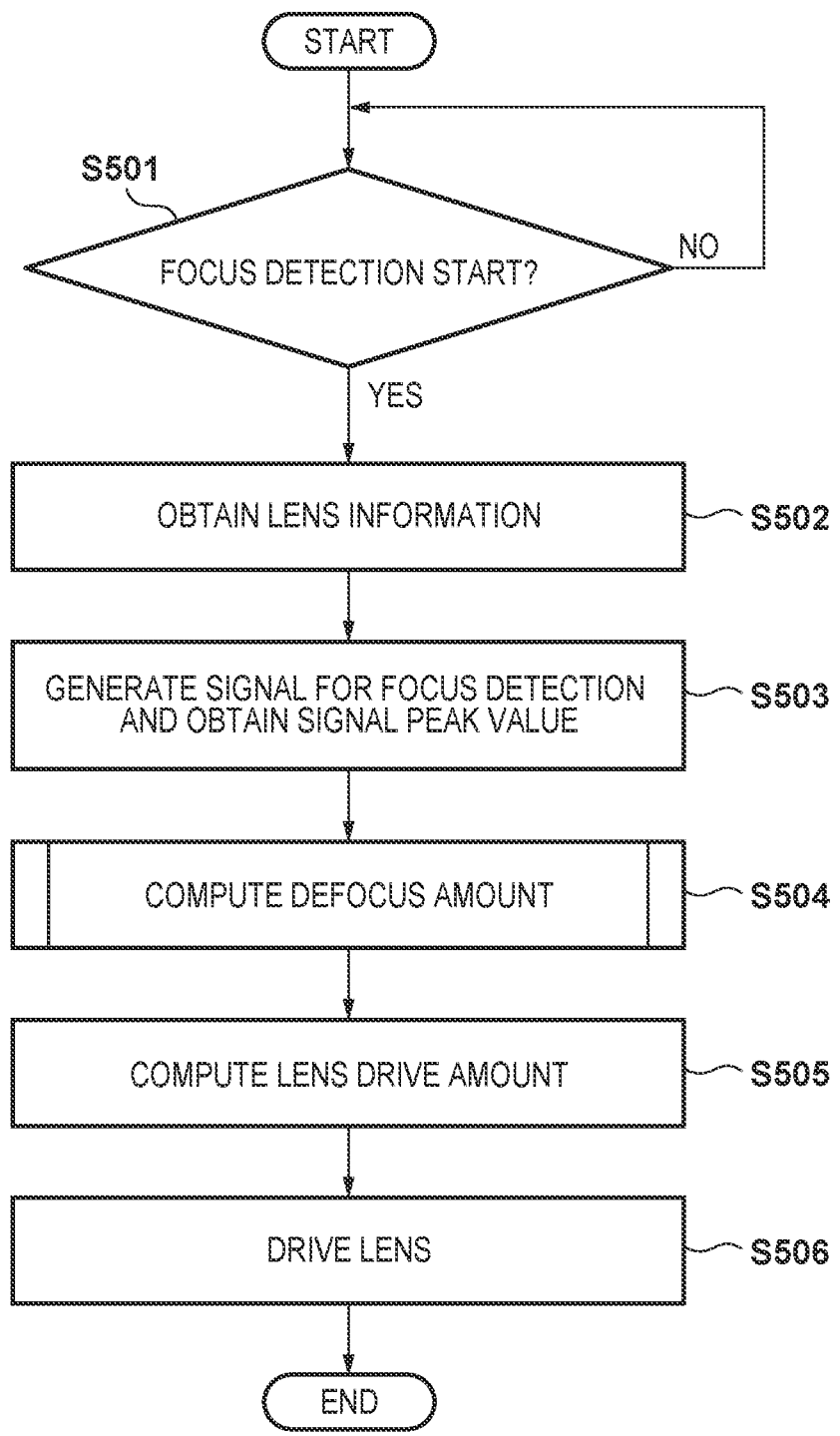
FIG. 8 is a flowchart showing an example of a focus adjustment operation in the embodiments.

Next, a focus adjustment operation in the camera 100 will be described with reference to a flowchart shown in FIG. 8. Note that the processing shown in FIG. 8 is processing performed in the state where the main mirror 130 and the sub mirror 131 are moved out of the light path (mirror-up), more specifically, processing performed at the time of live-view display (at the time of shooting a moving image for display) or at the time of recording a moving image (at the time of shooting a moving image for recording). Note that description is given here in which automatic focus detection by phase difference detection that uses output of the image sensor 14 is performed, but as above-described, automatic focus detection by contrast detection can also be performed.

In step S501, the system control unit 50 determines whether or not an instruction to start focus detection has been input via an operation of SW1 62, the operation unit 70 or the like. If it is determined that an instruction to start focus detection has been input, the system control unit 50 advances the procedure to step S502, and if not, the system control unit 50 stands by. Note that the system control unit 50 may advance the procedure to step S502 using start of live-view display or moving image recording as a trigger, regardless of whether or not an instruction to start focus detection has been input.

In step S502, the system control unit 50 obtains various types of lens information such as lens frame information and the focus lens position of the photographing lens 300 from the lens system control unit 346 via the interface units 38 and 338 and the connectors 122 and 322.

In step S503, the system control unit 50 instructs the image processing unit 20 to generate pairs of image signals for AF (first to third A images and B images) from pixel data within a focus detection area of frame image data that is being sequentially read out. The image processing unit 20 generates pairs of image signals for AF, and supplies the pairs of image signals for AF to the AF unit 42. The AF unit 42 performs processing for correcting the difference in signal level, and the like on the pairs of image signals for AF. The AF unit 42 also detects a peak value (maximum value) and a bottom value (minimum value) of the image signals for AF.

In step S504, the AF unit 42 computes, for example, the above-described correlation amount COR(k) for each of first A and B images, second A and B images and third A and B images, and detects, as the phase difference of the images, the shift amount k that minimizes the correlation value COR(k). The AF unit 42 then converts the detected phase difference into a defocus amount. The details of this processing will be described later. The AF unit 42 outputs the defocus amount to the system control unit 50.

In step S505, the system control unit 50 serving as an adjustment unit determines a focus lens drive amount and a drive direction of the photographing lens 300 based on the defocus amount obtained from the AF unit 42 in step S504.

In step S506, the system control unit 50 transmits information regarding the focus lens drive amount and the drive direction to the lens system control unit 346 of the photographing lens 300 via the interface units 38 and 338 and the connectors 122 and 322. The lens system control unit 346 transmits the information regarding the focus lens drive amount and the drive direction to the focus control unit 342. The focus control unit 342 drives the focus lens based on the received information regarding the lens drive amount and the drive direction. Accordingly, focus adjustment of the photographing lens 300 is performed. Note that the operation in FIG. 8 may be continuously performed also when moving image data for next frame transition has been read out. The information regarding the focus lens drive amount and the drive direction may be directly transmitted from the system control unit 50 to the focus control unit 342.

Next, the processing for computing a defocus amount performed by the AF unit 42 in step S504 in FIG. 8 will be further described with reference to a flowchart shown in FIG. 9. In step S5041, the AF unit 42 computes a correlation amount COR1(k) for the first A image As_1 and the first B image Bs_1 similarly to Expression 1. After obtaining the correlation amount COR1(k) for each shift amount k, the AF unit 42 obtains the value of the shift amount k at which the correlation between the first A image As_1 and the first B image Bs_1 is maximized, namely, the shift amount k at which the correlation amount COR1(k) is minimized. Note that the shift amount k when computing the correlation amount COR1(k) is assumed to be an integer, but in the case of obtaining the shift amount k at which the correlation amount COR1(k) is minimized, interpolation processing is performed as appropriate and values (real number values) in units of subpixels are obtained in order to improve the accuracy of the defocus amount.

In this embodiment, a shift amount dk at which the sign of the difference value of a correlation amount COR1 changes is computed as the shift amount k at which a correlation amount COR1(k) is minimized.

First, the AF unit 42 computes a difference value DCOR1 of the correlation amount in accordance with Expression 13 below.

$$DCOR1(k)=COR1(k)-COR1(k-1) \qquad 13$$

The AF unit 42 then uses the differential value DCOR1 of the correlation amount to obtain a shift amount dk1 at which the sign of the differential value changes. Letting the value of k immediately before the sign of the differential value changes be k1, and the value of k at which the sign has changed be k2 (k2=k1+1), the AF unit 42 computes the shift amount dk1 in accordance with Expression 14 below.

$$dk1=k1+|DCOR1(k1)|/|DCOR1(k1)-DCOR1(k2)| \qquad 14$$

In the above-described manner, the AF unit 42 computes, in units of subpixels, the shift amount dk1 at which the correlation amount of the first A image As_1 and the first B image Bs_1 is maximized, and ends the processing of step S5041. Note that a method for computing the phase difference of two one-dimensional image signals is not limited to the method described herein, and any known method can be used.

In step S5042, similar to step S5041, the AF unit 42 computes a difference DCOR2 of a correlation amount COR2(k) between the second A image As_2 and the second B image Bs_2, and computes, in units of subpixels, a shift amount dk2 at which the correlation amount of the second A image As_2 and the second B image Bs_2 is maximized.

In step S5043, similar to step S5041, the AF unit 42 computes a difference DCOR3 of a correlation amount COR3(k) between the third A image As_3 and the third B image Bs_3, and computes, in units of subpixels, a shift amount dk3 at which the correlation amount of the third A image As_3 and the third B image Bs_3 is maximized.

In step S5044, the AF unit 42 multiplies each of the shift amounts dk1, dk2 and dk3 computed in steps S5041 to S5043 by a predetermined defocus conversion coefficient, and converts the shift amounts into defocus amounts Def1, Def2 and Def3. Note that instead of multiplying a conversion coefficient each time, a defocus amount may be obtained using a table in which shift amounts and defocus amounts after conversion are associated with each other, or the like. Here, the defocus conversion coefficient can be obtained from an optical condition at the time of shooting (e.g., an aperture, an exit pupil distance and lens frame information), the image height of the focus detection area, the sampling pitch of the signals constituting the A and B images, and the like. In this embodiment, the sampling pitch of a sequence of signals of the second A image As_2 and the sampling pitch of a sequence of signals of the third A image As_3 are twice the sampling pitch of a sequence of signals of the first A image As_1. The same applies to the B images. Therefore, the defocus conversion coefficient by which the shift amounts dk2 and dk3 are multiplied is twice the defocus conversion coefficient by which the shift amount dk1 is multiplied.

The influence of noise on the defocus amounts Def2 and Def3 computed based on the second A and B images and the third A and B images, the correlation of whose noise components is lower than the first A and B images, is smaller than on the defocus amount Def1. On the other hand, the sampling pitch of the second A and B images and the third A and B images is twice the sampling pitch of the first A and B images, and the number of signals constituting the sequence of signals of the second A and B images and the third A and B images is half the number of signals constituting the sequence of signals of the first A and B images. Therefore, variation in the defocus amounts Def2 and Def3 obtained based on the second A and B images and the third A and B images is likely to be larger than variation in Def1. Therefore, a configuration may be adopted in which the average value of the defocus amounts Def2 and Def3 is computed as a defocus amount Def2' based on pairs of image signals, the correlation of whose noise components is low, and a defocus amount whose variation is suppressed is obtained. A case will be described below in which the defocus amount Def2' is computed.

In step S5045, the AF unit 42 selects one of the defocus amounts Def1 and Def2' as a final defocus amount Def.

The defocus amount Def1 that is based on a first pair of image signals (the first A image As_1 and the first B image Bs_1) has the following characteristics.

The noise components of the A and B images are correlated, and when the shift amount is 0, the correlation of noise takes a specific value. Therefore, in a situation in which the ratio of the correlation amount of noise components of the A and B images to the correlation amount of these images is relatively high, as in cases such as where the contrast of the object in a focus detection area is low, or the environment luminance at the time of shooting is low, the detection accuracy of the defocus amount may deteriorate.

The sampling frequency of the first pair of image signals is higher than those of the second pair of image signals (the second A image As_2 and the second B image Bs_2) and the third pair of image signals (the third A image As_3 and the third B image Bs_3). Therefore, compared with the defocus amount Def2' (as well as Def2 and Def3), the difference between the spatial frequency band of image signals used for focus detection and the spatial frequency band of imaging signals is small, and the defocus amount is unlikely to be affected by the aberration amount of the imaging optical system. Therefore, a defocus amount corresponding to an in-focus position whose difference from the best in-focus position of the imaging signals is small can be detected.

On the other hand, the defocus amount Def2' that is based on the second pair of image signals and the third pair of image signals has the following characteristics. The correlation of noise components of the A and B images is low. Therefore, even in a situation in which the ratio of the correlation amount of noise components of the A and B images to the correlation amount of those images is relatively high, in cases such as where the contrast of the object in a focus detection area is low, or the environment luminance at the time of shooting is low, the detection accuracy of a defocus amount is unlikely to deteriorate.

The sampling frequency of the second and third pairs of image signals is lower than the sampling frequency of the first pair of image signals. Therefore, the difference between the spatial frequency band of image signals used for focus detection and the spatial frequency band of imaging signals is large compared with the defocus amount Def1. As a result, the difference between the in-focus position corresponding to the detected defocus amount and the best in-focus position of imaging signals is greater than Def1 in some cases. Note that the defocus amounts Def2 and Def3 have similar characteristics.

In view of such characteristics of the defocus amounts Def1 and Def2', the AF unit 42 can select a finally detected defocus amount, for example, according to whether or not the shooting environment is a shooting environment in which presence or absence of correlation of noise components of the A and B images influences the error of a defocus amount that is detected.

In this embodiment, the AF unit 42 selects a defocus amount in accordance with the magnitude relationship between the peak value of image signals for AF (the first to third A and B images) obtained in step S503 and a predetermined threshold value PeakTh. Specifically, in step S5045, the AF unit 42 determines whether or not the peak value is larger than the predetermined threshold value PeakTh. If it is determined that the peak value is larger than the predetermined threshold value PeakTh, the procedure advances to step S5046, and if not, the procedure advances to step S5047. Here, a value stored in the non-volatile memory 56 in advance can be used as the threshold value PeakTh according to the combination of imaging conditions such as the aperture at the time of shooting, the accumulation time (the electronic shutter speed) and the ISO sensitivity, the above-described optical condition, and the like.

In step S5046, the AF unit 42 selects Def1, and ends the processing.

In step S5047, the AF unit 42 selects Def2', and ends the processing.

According to this embodiment, a first pair of image signals of a type in which the correlation of included noise components is large and a second pair of image signals in which the correlation of included noise components is lower than that of the first pair of image signals are generated as pairs of image signals that are based on a plurality of types of signals read out from the same pixel. One of a defocus amount detected based on the first pair of image signals and a defocus amount that is based on the second pair of image signals is then selected for use according to whether or not the conditions are set in which the detected defocus amounts are likely to be affected by the correlation of the noise components. With such a configuration, it is possible to suppress the influence, on focus detection, of noise that is included in a pair of signals and correlated with each other, in a focus detection device that performs focus detection by phase difference detection based on a pair of signals obtained from an image sensor and a control method thereof.

Modified Example 1

Note that in this embodiment, one of a plurality of defocus amounts detected based on the first to third pairs of image signals in steps S5045 to S5047 is selected based on the peak value of the first to third pairs of image signals. Selection based on the signal peak value is effective particularly if the noise components included in the A and B images are negatively correlated. The noise components included in the A and B images are negatively correlated in a case where the amounts of the noise components that are in proportion to the signal amounts of the A+B image and the A image and are positively correlated are small. Such a case is a case where the signal amounts of the A and B images are relatively small. Therefore, in this embodiment, the peak value is used as an evaluation value for determining the case in which the signal amounts of the A and B images are relatively small, where the noise components included in the A and B images are negatively correlated.

However, the essence of the determination in step S5045 is determining whether or not the correlation of noise components included in a pair of image signals influences a phase difference detection error. Therefore, similar determination may be performed using another evaluation value. For example, it is possible to determine the case in which the signal amounts of A and B images are relatively small, using a bottom value, an amplitude value, a photometric value of signals or the like as an evaluation value, instead of a peak value.

In addition, in the case where the signal amounts of the A and B images are relatively large, it is conceivable that the noise components included in the A and B images are positively correlated, and thus it is possible to realize focus detection in which the influence of the noise components is suppressed, by selecting Def2'. It is possible to determine that the signal amounts of the A and B images are relatively large, for example, by the bottom value of the first to third pairs of image signals being larger than a threshold value. However, for example, the determination is also possible using another evaluation value such as the integration value of luminance output of the A and B images. This is because the noise amount and the magnitude of the signal amount are correlated similarly to the bottom value of signals. Therefore, a configuration may be adopted in which, in step S5045, it is determined whether or not the bottom value of the first to third pairs of image signals is larger than a threshold value, and if it is determined that the bottom value of the first to third pairs of image signals is larger than the threshold value, the procedure advances to step S5047, and if not, the procedure advances to step S5046.

Note that a configuration may be adopted in which both the case where the signal amounts of the A and B images are relatively small and the case where these signal amounts are relatively large are determined. For example, a configuration can be adopted in which in a case where the peak value of the first to third pairs of image signals is smaller than or equal to a first threshold value and in a case where the bottom value of the first to third pairs of image signals is larger than a second threshold value, Def2 is selected, and otherwise, Def1 is selected. Accordingly, a determination method is arbitrary as long as being capable of selecting Def2 if it is determined that the correlation of the noise components included in the pair of image signals influences the phase difference detection error, and selecting Def1 if not.

Modified Example 2

In this embodiment, a final defocus amount is selected from a plurality of defocus amounts detected in a plurality of image signals. However, a configuration may be adopted in which a defocus amount is detected only in one pair of image signals whose noise components are not correlated or correlated in a sufficiently small amount among a plurality of pairs of image signals, and is used. This can reduce an operation load required for computing the defocus amount. In this case, a pair of image signals whose noise components are envisioned to be not correlated or correlated in a sufficiently small amount can be determined in advance from a plurality of pairs of image signals based on a generation method, for example.

Modified Example 3

In this embodiment, the influence of the correlation of the noise components included in the A and B images on the defocus amount is suppressed by using the second and third pairs of image signals in which the column position of the pixel group used for generating the A image and the column position of the pixel group used for generating the B image are made different. However, a similar effect can also be obtained by computing the correlation amount COR after applying digital filters to the first A image (As_1) and the first B image (Bs_1). For example, it is sufficient that digital filters in a row direction such as [1,0,-1] are applied to the first A image (As_1) and the first B image (Bs_1), and the correlation amount COR(k) is then computed by Expression 1' below.

$$COR(k) = \sum_{i=1}^{4N-1-2\times kmax} |A(i-k) - B(i+k+1)| \quad (1')$$

$$(-kmax \leq k \leq kmax)$$

Sequences of signals constituting the first A image (As_1) and the first B image (Bs_1) to which the digital filters are applied form a sequence of signals in which signals computed from even-numbered A signals (B signals) and signals computed from odd-numbered A signals (B signals) are arranged alternately. Therefore, as in Expression 1', it is possible to obtain the correlation amount COR in which the influence of the correlation of the noise components of the A and B images is reduced by shifting the B image by one and computing the correlation amount COR.

Modified Example 4

In this embodiment, the influence of the correlation of the noise components included in the A and B images on the defocus amount is suppressed by using the second and third pairs of image signals in which the column position of the pixel group used for generating the A image and the column position of the pixel group used for generating the B image are differentiated from each other. This is based on the assumption that noise included in output of a plurality of pixels that share the same microlens is correlated. However, the A and B images can be generated so as to remove or reduce any factor of correlation of noise components included in the A and B images, and it is not limited to the case where the same microlens is shared. For example, an A signal and a B signal can be selected such that one or more of a floating diffusion, a signal output line and an amplifier circuit that are on the path of the signals do not overlap. In addition, if there is variation in transmissivity of color filters of the same color, an A signal and a B signal can be selected so as not to use output of pixels whose color filters have close transmissivity.

Second Embodiment

Next, a second embodiment of the present invention will be described. The main difference from the first embodiment is a method for generating second and third pairs of image signals (As_2 and Bs_2, and As_3 and Bs_3), the correlation of whose noise components is low. In the first embodiment, the second and third pairs of image signals are generated by thinning the signals in one pixel row in the horizontal direction, and thus there is a possibility that the resolution of the phase difference that can be detected in the second/third pair of image signals deteriorates. In the second embodiment, second and third pairs of image signals, the correlation of whose noise components is low, are generated by using signals of different pixel rows without thinning the pixels in the horizontal direction. Accordingly, it is made possible to detect the phase difference of the second (or third) pair of image signals with the resolution that is equivalent to the resolution of the phase difference that can be detected in a first pair of image signals, while suppressing the influence of the correlation of noise components included in the image signals.

Note that a block diagram of an image capture apparatus (FIG. 1), diagrams illustrating an image sensor and a focus detection method (FIGS. 3 and 4), a diagram illustrating a focus detection area (FIG. 6) and flowcharts of a focus adjustment operation and defocus amount computation (FIGS. 8 and 9) are used in this embodiment as well.

Processing for generating focus detection signals in the second embodiment will be described below.

Figure 10:
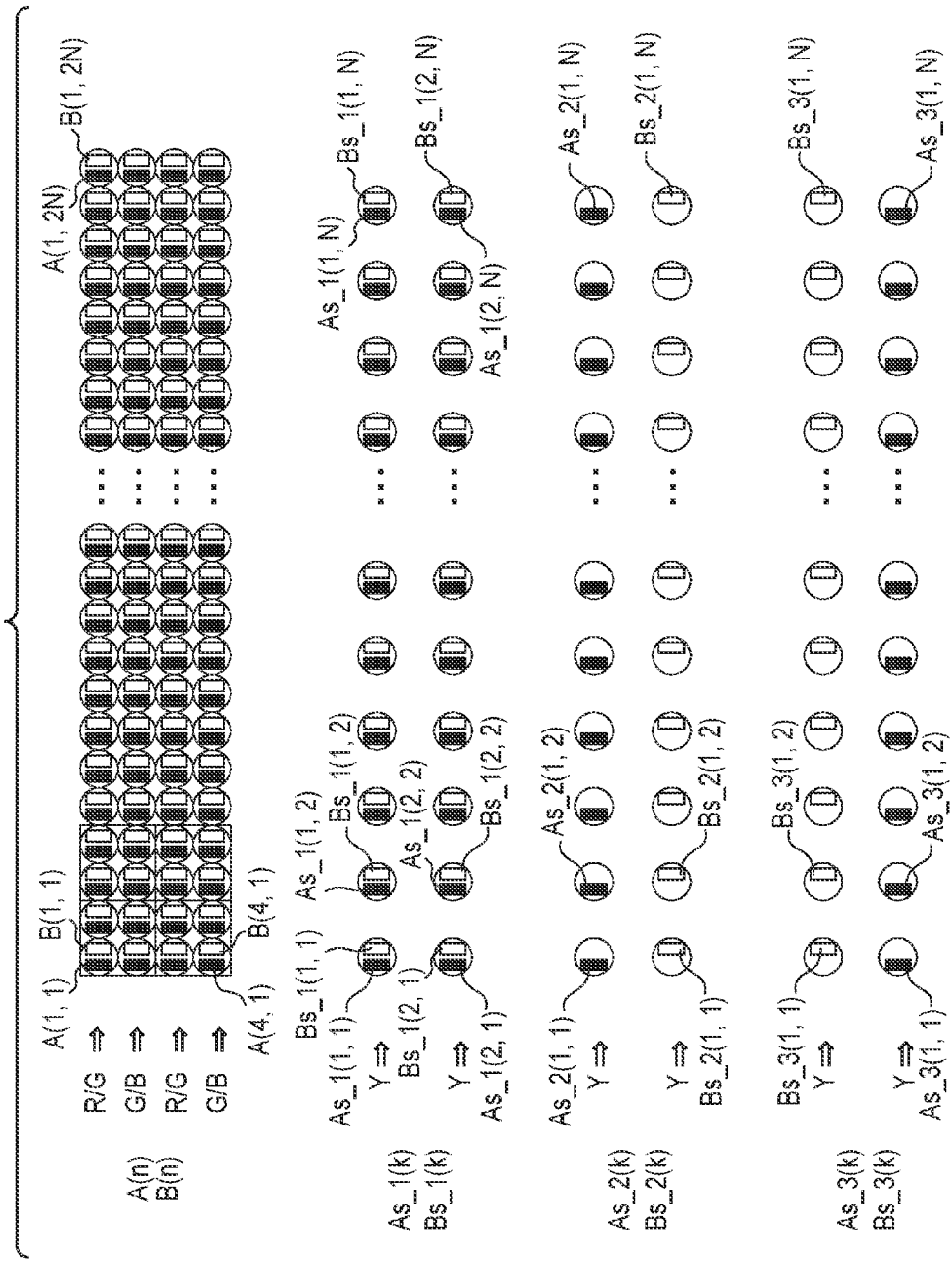
FIG. 10 is a diagram schematically showing an example of a method for generating pairs of image signals in a second embodiment.

FIG. 10 shows pixels of 4 rows and 2N columns arranged in a focus detection area 401. In this embodiment as well, a pixel (a photodiode 201a) used for generating a signal of an A image for AF in an i-th row and a j-th column and output thereof are denoted by A(i,j). Similarly, a pixel (a photodiode 201b) used for generating a signal of a B image for AF in the i-th row and the j-th column and output thereof are denoted by B(i,j).

In the first embodiment, a sequence of signals is generated from addition pixel signals obtained by adding output of two pixels in the horizontal direction, but in this embodiment, a sequence of signals is generated from addition pixel signals obtained by adding output of four pixels (two horizontal pixels×two vertical pixels). Here, each of the signals constituting a first A image As_1 generated from the pixels in the i-th row is denoted by $As\_1(i,k)$, and each of the signals constituting a first B image Bs_1 is denoted by $Bs\_1(i,k)$ (k is a signal number of a signal constituting each sequence of signals). In this case, $As\_1(1,k)$ and $Bs\_1(1,k)$ for the pixels of 4 rows and 2N columns shown in FIG. 7 can be expressed as Expression 15 below.

$As\_1(i,k)=A(2\times i-1,2\times(k-1)+1)+A(2\times i-1,2\times(k-1)+2)+A(2\times i,2\times(k-1)+1)+A(2\times i,2\times(k-1)+2)$ $Bs\_1(i,k)=B(2\times i-1,2\times(k-1)+1)+B(2\times i-1,2\times(k-1)+2)+B(2\times i,2\times(k-1)+1)+B(2\times i,2\times(k-1)+2)$ $(i-1)(1\leq k\leq N)$     15

Also, each of the signals constituting a second A image As_2 generated from the pixels in the i-th row is denoted by $As\_2(i,k)$, and each of the signals constituting a second B image Bs_2 is denoted by $Bs\_2(i,k)$. In this case, $As\_2(1,k)$ and $Bs\_2(1,k)$ for pixels of 4 rows and 2N columns shown in FIG. 10 can be expressed as Expression 16 below.

$As\_2(i,k)=As\_1(i,k)$ $Bs\_2(i,k)=Bs\_1(i+1,k)$ $(i=1)(1\leq k\leq N)$     16

Furthermore, each of the signals constituting a third A image As_3 generated from the pixels in the i-th row is denoted by $As\_3(i,k)$, and each of the signals constituting a third B image Bs_3 is denoted by $Bs\_3(i,k)$. In this case, $As\_3(1,k)$ and $Bs\_3(1,k)$ for the pixels of 4 rows and 2N columns shown in FIG. 10 can be expressed as Expression 17 below.

$As\_3(i,k)=As\_1(i+1,k)$ $Bs\_3(i,k)=Bs\_1(i,k)$ $(i=1)(1\leq k\leq N)$     17

In this embodiment as well, the first A image (As_1) and the first B image (Bs_1) are generated based on the signals of pixels that share a microlens and a readout circuit. Therefore, noise components included in an A signal and an A+B signal are correlated positively for the signal amounts, and a noise component included in a B signal generated by subtracting the A signal from the A+B signal is negatively correlated to the noise component included in the A signal. Therefore, noise components included in the first A image (As_1) and the first B image (Bs_1) expressed with Expression 15 are correlated.

On the other hand, the second A image (As_2) and the second B image (Bs_2) expressed with Expression 16 are combination of the first A image (As_1) and the first B image (Bs_1), and are based on different pixel groups (pixel rows). Therefore, the sampling position of the optical image of the object regarding the second A image (As_2) and the sampling position of the optical image of the object regarding the second B image (Bs_2) are deviated from each other. Accordingly, a pixel group used for generating the second A image (As_2) and a pixel group used for generating the second B image (Bs_2) do not overlap, and thus the correlation of noise components included in the second A image (As_2) and second the B image (Bs_2) is low. Therefore, it becomes possible to obtain a correlation amount in which the influence of the correlation of the noise components is suppressed, by computing a correlation amount COR using the second A image (As_2) and second the B image (Bs_2). The same applies to the third A image (As_3) and the third B image (Bs_3) expressed with Expression 17.

In addition, the sampling pitch of the second and third pairs of image signals of this embodiment in the row direction is the same as that of the first pair of image signals. Therefore, unlike the first embodiment, also regarding the phase difference detected in the second pair of image signals and the third pair of image signals, it is possible to realize a resolution that is equal to the resolution regarding the phase difference detected in the first pair of image signals.

Accordingly, in this embodiment, a first pair of sequences of signals (the first A image As_1 and the first B image Bs_1), whose noise components are correlated to each other, is generated for each predetermined pixel group based on output signals of the pixel group.

In addition, a second pair of sequences of signals is generated by combining, out of a first sequence of signals (the first A image As_1) and a second sequence of signals (the first B image Bs_1) constituting the first pair of sequences of signals, the first sequence of signals and the second sequence of signals generated based on output signals of different pixel groups.

Furthermore, a third pair of sequences of signals is generated by combining, out of the first sequence of signals (the first A image As_1) and the second sequence of signals (the first B image Bs_1) constituting the first pair of sequences of signals, the first sequence of signals and the second sequence of signals generated based on output signals of different pixel groups. Here, the second pair of sequences of signals and the third pair of sequences of signals are different in combination of the first sequence of signals and the second sequence of signals.

Figure 9:
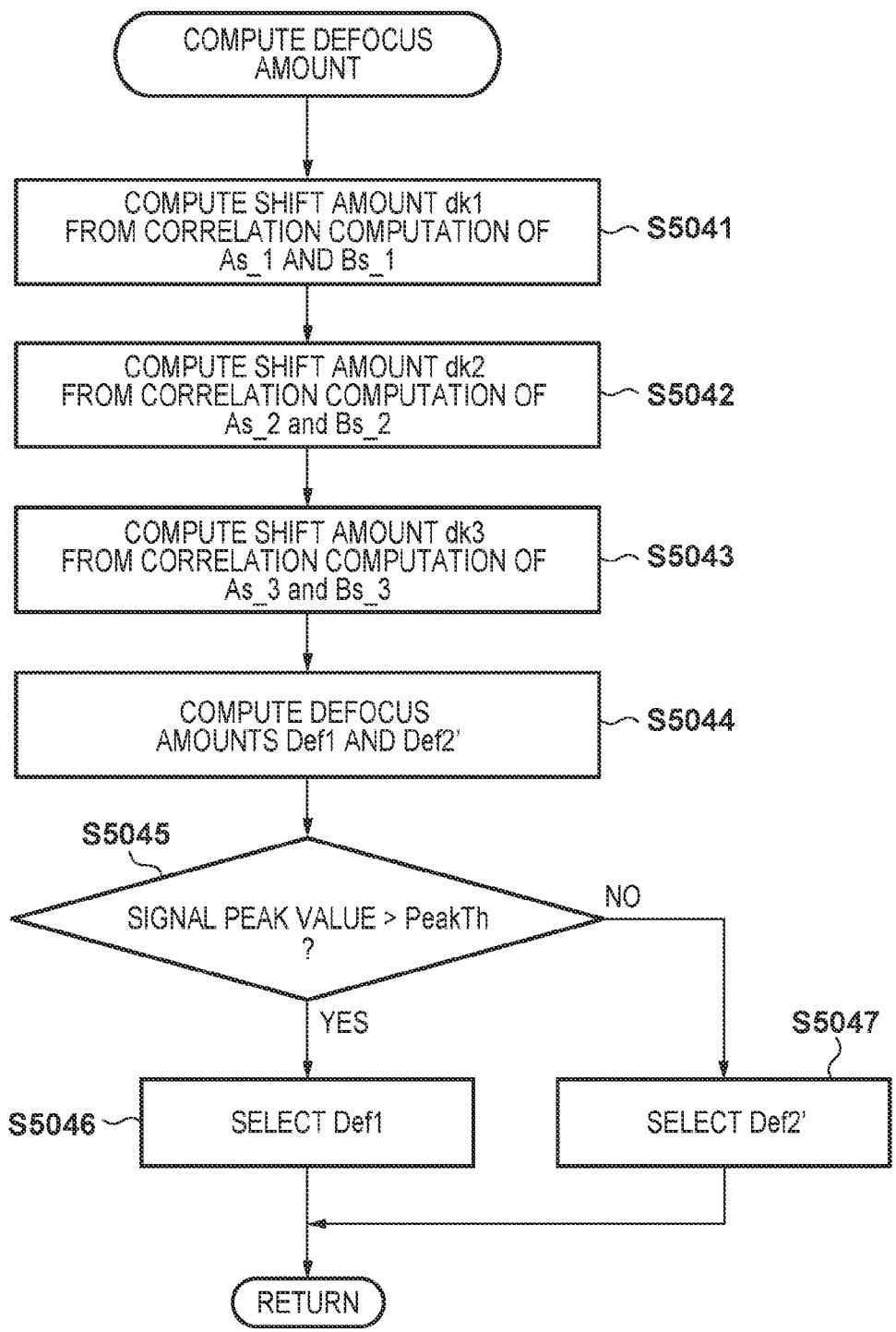
FIG. 9 is a flowchart showing an example of a method for computing a defocus amount in the embodiments.

As described above, regarding each of the three types of generated pairs of sequences of signals, similarly to the first embodiment, detection of phase differences (shift amounts) dk1 to dk3 and computation of defocus amounts Def1 and Def2' are performed in steps S5041 to 5044 of processing for computing a defocus amount (FIG. 9). The shift amounts dk2 and dk3 obtained in this embodiment are based on the correlation amount of images of different pixel rows, and thus an error due to the difference in waveform between the A and B images can occur. However, an error that can be included in the shift amount dk2 and an error that can be included in the shift amount dk3 have different signs and substantially the same amount, and thus the errors are reduced by obtaining Def2' by averaging Def2 and Def3.

As described above, according to this embodiment, a pair of image signals used for computing a correlation amount is generated based on output of different pixel rows. By computing the correlation amount based on this pair of image signals, it is possible to obtain a correlation amount in which the influence of the correlation of noise included in the image signals is reduced. In addition, a phase difference and a defocus amount can be computed with a resolution same as the resolution of a pair of image signals generated based on the signals of the same pixel row.

Modified Example

In the second embodiment, two types of pairs of image signals (the second and third pairs of image signals) in which combination of the A and B images is different from the first pair of image signals are generated from a plurality of first pairs of image signals generated from different pixel rows, and a correlation amount is computed. However, a method for generating the second and third pairs of image signals is not limited thereto. For example, a configuration may be adopted in which in the case of computing a correlation amount of signals obtained by adding a plurality of A images (B images), A images obtained from odd-numbered pixel rows are added, and B images obtained from even-numbered pixel rows are added. Conversely, a configuration may be adopted in which A images obtained from even-numbered pixel rows are added, and B images obtained from odd-numbered pixel rows are added. Other methods may also be used.

In addition, processing for averaging the correlation amounts Def2 and Def3 computed from a pair of image signals, the correlation of whose noise components is low, does not need to be performed. For example, a configuration may be adopted in which, if the difference in waveform between the A and B images can be expected to be sufficiently small, only one of Def2 and Def3 is obtained, and is used as Def2'. For example, this can be applied to cases such as where the direction of the contrast of the object is not oblique, and there is contrast change only in the phase difference detection direction, but the present invention is not limited thereto. In addition, instead of processing for averaging the correlation amounts Def2 and Def3, the shift amount dk2 and dk3 may be averaged.

A B image with which an A image generated from output signals of an n-th pixel row forms a pair may be generated by averaging two B images generated from output signals of an (n−1)th and an (n+1)th pixel rows in order to reduce the difference in shape of the image signals caused by generating a pair of image signals from different pixel rows.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-096257, filed on May 12, 2016, and No. 2016-106714, filed on May 27, 2016, which are hereby incorporated by reference herein in their entirety.

What is claimed is:

1. A focus detection device comprising:
a controller, having a processor which executes instructions stored in a memory or having circuitry, being configured to function as:
a generation unit configured to generate a plurality of pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system;
an obtaining unit configured to obtain, for each of the pairs of image signals, a defocus amount that is based on a correlation amount of one pair of image signals constituting the pairs of image signals; and
an adjustment unit configured to adjust a focus distance of the imaging optical system based on the defocus amount,
wherein:
each of the pairs of image signals is constituted by a first image signal and a second image signal;
the generation unit generates the first image signals from the first signals, and generates the second image signals from the second signals;
correlation of noise components included in the first image signal and the second image signal constituting a second pair of image signals among the pairs of image signals is lower than correlation of noise components included in the first image signal and the second image signal constituting a first pair of image signals: and
the adjustment unit adjusts the focus distance of the imaging optical system based on one of a defocus amount that is based on a correlation amount of the first pair of image signals and a defocus amount that is based on a correlation amount of the second pair of image signals.

2. The focus detection device according to claim 1, wherein the generation unit:
generates the first image signal of the second pair of image signals using a portion of the first signals used for generating the first image signals of the first pair of image signals; and generates the second image signal of the second pair of image signals using a portion of the second signals used for generating the second image signals of the first pair of image signals.

3. The focus detection device according to claim 1, wherein the plurality of pairs of image signals further include a third pair of image signals, correlation of noise components included in the first image signal and the second image signal constituting the third pair of image signals is lower than the correlation of the noise components included in the first image signal and the second image signal constituting the first pair of image signals, and the generation unit:

generates the first image signal of the third pair of image signals using a portion of the first signals that are used for generating the first image signals of the first pair of image signals and are not used for generating the first image signal of the second pair of image signals; and generates the second image signal of the third pair of image signals using a portion of the second signals that are used for generating the second image signals of the first pair of image signals and are not used for generating the second image signal of the second pair of image signals.

4. The focus detection device according to claim 3, wherein the adjustment unit adjusts the focus distance of the imaging optical system using one of the defocus amount that is based on the correlation amount of the first pair of image signals, the defocus amount that is based on the correlation amount of the second pair of image signals and a defocus amount that is based on a correlation amount of the third pair of image signals.

5. The focus detection device according to claim 3, wherein a combination of the first image signal and the second image signal constituting the second pair of image signals and the third pair of image signals is differentiated from a combination of the first image signal and the second image signal constituting the first pair of image signals.

6. The focus detection device according to claim 1, wherein the adjustment unit determines, based on a magnitude of the noise components included in the pairs of image signals, which of the defocus amount that is based on the correlation amount of the first pair of image signals and the defocus amount that is based on the correlation amount of the second pair of image signals is to be used to adjust the focus distance of the imaging optical system.

7. The focus detection device according to claim 1, wherein:

in a case where a signal amount of the plurality of pairs of image signals is a first value, the adjustment unit adjusts the focus distance of the imaging optical system based on the defocus amount that is based on the correlation amount of the second pair of image signals; and in a case where the signal amount of the pairs of image signals is a second value that is greater than the first value, the adjustment unit adjusts the focus distance of the imaging optical system based on the defocus amount that is based on the correlation amount of the first pair of image signals.

8. The focus detection device according to claim 7, wherein if it is determined that a peak value of the plurality of pairs of image signals is greater than a threshold value, the adjustment unit adjusts the focus distance of the imaging optical system based on the defocus amount that is based on the correlation amount of the first pair of image signals.

9. The focus detection device according to claim 1, wherein if it is determined that a bottom value of the plurality of pairs of image signals is greater than a threshold value, the adjustment unit adjusts the focus distance of the imaging optical system at least based on the defocus amount that is based on the correlation amount of the second pair of image signals.

10. The focus detection device according to claim 1, wherein the second signals are obtained by subtracting the first signals obtained from the first photoelectric conversion portions from third signals obtained from both the first photoelectric conversion portions and the second photoelectric conversion portions included in the same pixels.

11. The focus detection device according to claim 1, wherein the second signals are obtained by taking a difference between the first signals and third signals obtained from the first photoelectric conversion portions and the second photoelectric conversion portions.

12. An image capture apparatus comprising:

an image sensor that has a plurality of first photoelectric conversion portions and a plurality of second photoelectric conversion portions; and a focus detection device comprising:

a controller, having a processor which executes instructions stored in a memory or having circuitry, being configured to function as:

a generation unit configured to generate a plurality of pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system;

an obtaining unit configured to obtain, for each of the pairs of image signals, a defocus amount that is based on a correlation amount of one pair of image signals constituting the pairs of image signals; and an adjustment unit configured to adjust a focus distance of the imaging optical system based on the defocus amount, wherein:

each of the pairs of image signals is constituted by a first image signal and a second image signal;

the generation unit generates the first image signals from the first signals, and generates the second image signals from the second signals;

correlation of noise components included in the first image signal and the second image signal constituting a second pair of image signals among the pairs of image signals is lower than correlation of noise components included in the first image signal and the second image signal constituting a first pair of image signals: and the adjustment unit adjusts the focus distance of the imaging optical system based on one of a defocus amount that is based on a correlation amount of the first pair of image signals and a defocus amount that is based on a correlation amount of the second pair of image signals.

13. An image capture apparatus comprising:
an image sensor that has a plurality of first photoelectric conversion portions and a plurality of second photoelectric conversion portions; and
a focus detection device comprising:
a controller, having a processor which executes instructions stored in a memory or having circuitry, being configured to function as:
a generation unit configured to generate pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system, of an image sensor in which are arranged pixels each having the first photoelectric conversion portion and the second photoelectric conversion portion;
a computation unit configured to compute a phase difference of the pairs of image signals by performing a correlation computation on the first signals and the second signals obtained from different pixels; and
an adjustment unit configured to adjust a focus distance of the imaging optical system based on the phase difference,
wherein:
the pairs of image signals include first image signals constituted by a plurality of the first signals and second image signals constituted by a plurality of the second signals;
each of the plurality of pixels of the image sensor also has a microlens that is shared by the first photoelectric conversion portion and the second photoelectric conversion portion;
the pairs of image signals include, as pairs, the first signals and the second signals respectively obtained from the first photoelectric conversion portions and the second photoelectric conversion portions, any pair of which does not share a same microlens;
the generation unit generates the pairs of image signals constituted by first image signals in which signals computed from even-numbered signals out of the first signals and signals computed from odd-numbered signals are alternately arranged and second image signals in which signals computed from even-numbered signals out of the second signals and signals computed from odd-numbered signals are alternately arranged, from the first signals and the second signals respectively obtained from the first photoelectric conversion portions and the second photoelectric conversion portions, each of the first photoelectric conversion portions and each of the second photoelectric conversion portions constituting the same pixel; and
the computation unit performs the correlation computation with the first image signal and the second image signal shifted by one from each other, to perform a correlation computation in which the first signals and the second signals obtained from different pixels are paired.

14. The focus detection device according to claim 13, wherein the generation unit generates the pairs of image signals as pairs of the first signals and the second signals obtained from different pixels, and the generation unit performs the correlation computation using the pairs of image signals that include the first signals and the second signals obtained from different pixels as pairs.

15. A control method of a focus detection device, comprising:
generating a plurality of pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system;
obtaining, for each of the pairs of image signals, a defocus amount that is based on a correlation amount of one pair of image signals constituting the pairs of image signals; and
adjusting a focus distance of the imaging optical system based on the defocus amount,
wherein:
each of the pairs of image signals is constituted by a first image signal and a second image signal;
in the generating, the first image signals are generated from the first signals, and the second image signals are generated from the second signals;
correlation of noise components included in the first image signal and the second image signal constituting a second pair of image signals among the pairs of image signals is lower than correlation of noise components included in the first image signal and the second image signal constituting a first pair of image signals; and
in the adjusting, the focus distance of the imaging optical system is adjusted based on one of a defocus amount that is based on a correlation amount of the first pair of image signals and a defocus amount that is based on a correlation amount of the second pair of image signals.

16. A control method of an image capture apparatus, comprising:
generating pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system, of an image sensor in which are arranged pixels each having the first photoelectric conversion portion and the second photoelectric conversion portion;
computing, using the pairs of image signals, a phase difference of one pair of image signals by performing a correlation computation in which the first signals and the second signals obtained from different pixels are paired; and
adjusting a focus distance of the imaging optical system based on the phase difference,
wherein:
the pairs of image signals include first image signals constituted by a plurality of the first signals and second image signals constituted by a plurality of the second signals;

each of the plurality of pixels of the image sensor also has a microlens that is shared by the first photoelectric conversion portion and the second photoelectric conversion portion;

the pairs of image signals include, as pairs, the first signals and the second signals respectively obtained from the first photoelectric conversion portions and the second photoelectric conversion portions, any pair of which does not share a same microlens;

the generating generates the pairs of image signals constituted by first image signals in which signals computed from even-numbered signals out of the first signals and signals computed from odd-numbered signals are alternately arranged and second image signals in which signals computed from even-numbered signals out of the second signals and signals computed from odd-numbered signals are alternately arranged, from the first signals and the second signals respectively obtained from the first photoelectric conversion portions and the second photoelectric conversion portions, each of the first photoelectric conversion portions and each of the second photoelectric conversion portions constituting the same pixel; and the computing performs the correlation computation with the first image signal and the second image signal shifted by one from each other, to perform a correlation computation in which the first signals and the second signals obtained from different pixels are paired.

17. A non-transitory computer-readable medium that stores a program for causing a computer of a focus detection device to function as a focus detection device comprising:

a generation unit configured to generate a plurality of pairs of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system;

an obtaining unit configured to obtain, for each of the pairs of image signals, a defocus amount that is based on a correlation amount of one pair of image signals constituting the pairs of image signals; and an adjustment unit configured to adjust a focus distance of the imaging optical system based on the defocus amount, wherein:

each of the pairs of image signals is constituted by a first image signal and a second image signal;

the generation unit generates the first image signals from the first signals, and generates the second image signals from the second signals;

correlation of noise components included in the first image signal and the second image signal constituting a second pair of image signals among the pairs of image signals is lower than correlation of noise components included in the first image signal and the second image signal constituting a first pair of image signals: and the adjustment unit adjusts the focus distance of the imaging optical system based on one of a defocus amount that is based on a correlation amount of the first pair of image signals and a defocus amount that is based on a correlation amount of the second pair of image signals.

18. A non-transitory computer-readable medium that stores a program for causing a computer of an image capture apparatus to function as a focus detection device comprising:

a generation unit configured to generate pair of image signals from a plurality of first signals obtained from a plurality of first photoelectric conversion portions that receive light flux that passes through a first pupil area of an exit pupil of an imaging optical system and a plurality of second signals obtained from a plurality of second photoelectric conversion portions that receive light flux that passes through a second pupil area of the exit pupil of the imaging optical system, of an image sensor in which are arranged pixels each having the first photoelectric conversion portion and the second photoelectric conversion portion;

a computation unit configured to compute a phase difference of the pair of image signals by performing a correlation computation on the first signals and the second signals obtained from different pixels; and an adjustment unit configured to adjust a focus distance of the imaging optical system based on the phase difference, wherein:

the pairs of image signals include first image signals constituted by a plurality of the first signals and second image signals constituted by a plurality of the second signals;

each of the plurality of pixels of the image sensor has a microlens that is shared by the first photoelectric conversion portion and the second photoelectric conversion portion;

the pairs of image signals include, as pairs, the first signals and the second signals respectively obtained from the first photoelectric conversion portions and the second photoelectric conversion portions, any pair of which does not share a same microlens;

the generation unit generates the pairs of image signals constituted by first image signals in which signals computed from even-numbered signals out of the first signals and signals computed from odd-numbered signals are alternately arranged and second image signals in which signals computed from even-numbered signals out of the second signals and signals computed from odd-numbered signals are alternately arranged, from the first signals and the second signals respectively obtained from the first photoelectric conversion portions and the second photoelectric conversion portions, each of the first photoelectric conversion portions and each of the second photoelectric conversion portions constituting the same pixel; and the computation unit performs the correlation computation with the first image signal and the second image signal shifted by one from each other, to perform a correlation computation in which the first signals and the second signals obtained from different pixels are paired.

* * * * *